United States Patent
Abe et al.

(10) Patent No.: US 12,479,819 B2
(45) Date of Patent: Nov. 25, 2025

(54) METHOD AND COMPOUND USEFUL IN PREPARATION OF OREXIN-2 RECEPTOR ANTAGONIST, AND LEMBOREXANT HAVING FEW IMPURITIES

(71) Applicant: Eisai R&D Management Co., Ltd., Tokyo (JP)

(72) Inventors: Taichi Abe, Kamisu (JP); Kazuhiro Yoshizawa, Kamisu (JP); Yuzo Watanabe, Kamisu (JP); Takeshi Miura, Kamisu (JP); Yusuke Ayata, Kamisu (JP); Yoshinori Yasuda, Kamisu (JP)

(73) Assignee: Eisai R&D Management Co., Ltd., Tokyo (JP)

( * ) Notice: Subject to any disclaimer, the term of this patent is extended or adjusted under 35 U.S.C. 154(b) by 698 days.

(21) Appl. No.: 17/604,527

(22) PCT Filed: May 13, 2020

(86) PCT No.: PCT/JP2020/019037
§ 371 (c)(1),
(2) Date: Oct. 18, 2021

(87) PCT Pub. No.: WO2020/230800
PCT Pub. Date: Nov. 19, 2020

(65) Prior Publication Data
US 2022/0194925 A1    Jun. 23, 2022

(30) Foreign Application Priority Data

May 15, 2019  (JP) .................. 2019-092254
Dec. 27, 2019  (JP) .................. 2019-238904

(51) Int. Cl.
C07D 401/12 (2006.01)
C07C 41/09 (2006.01)
C07D 239/34 (2006.01)

(52) U.S. Cl.
CPC ............ C07D 401/12 (2013.01); C07C 41/09 (2013.01); C07D 239/34 (2013.01)

(58) Field of Classification Search
CPC .................................................. C07D 401/12
See application file for complete search history.

(56) References Cited

U.S. PATENT DOCUMENTS

| | | | |
|---|---|---|---|
| 5,856,529 A | 1/1999 | Catt et al. | |
| 5,981,571 A | 11/1999 | Catt et al. | |
| 6,060,506 A | 5/2000 | Catt et al. | |
| 8,268,848 B2 * | 9/2012 | Terauchi | A61P 25/24 544/298 |
| 9,416,109 B2 * | 8/2016 | Moniz | C07C 303/28 |
| 9,828,336 B2 * | 11/2017 | Moniz | C07C 29/147 |
| 10,065,930 B2 * | 9/2018 | Watanabe | C07D 239/36 |
| 10,759,779 B2 | 9/2020 | Chen et al. | |
| 2012/0095031 A1 | 4/2012 | Terauchi et al. | |
| 2012/0165339 A1 | 6/2012 | Terauchi et al. | |
| 2015/0025237 A1 | 1/2015 | Moniz et al. | |
| 2020/0190060 A1 | 6/2020 | Chen et al. | |

FOREIGN PATENT DOCUMENTS

| | | |
|---|---|---|
| EP | 3848348 | 7/2021 |
| JP | 2015-509939 | 4/2015 |
| RU | 2190609 C2 | 10/2002 |
| RU | 2571414 | 12/2015 |
| RU | 2617696 | 4/2017 |
| WO | WO 2008/150364 A1 | 12/2008 |
| WO | WO 2012/039371 | 3/2012 |
| WO | WO 2013/123240 | 8/2013 |
| WO | WO 2019/024845 | 2/2019 |
| WO | WO 2020/050339 | 3/2020 |

OTHER PUBLICATIONS

Bartlett "Exploiting Chemical Diversity for Drug Discovery" Edited by Paul A Bartlett and Michael Entzeroth, The Royal Society of Chemistry, 2006, pp. 113-118.*
"Find ETDs Home » Thesis Resources » Find ETDs" Online: "https://ndltd.org/thesis-resources/find-etds/" Accessed Jan. 31, 2023.*
Irwin "ZINC—A Free Database of Commercially Available Compounds for Virtual Screening" J. Chem. Inf. Model. 2005, 45, 177-182.*
Kim "PubChem in 2021: new data content and improved web interfaces" Nucleic Acids Research, 2021, vol. 49, Database issue Published online Nov. 5, 2020.*
STN Registry/Zregistry (CAS Registrysm) Sep. 2016 2 pages.*
Office Action in Israeli Patent Application No. 287031, dated May 23, 2024, 2 pages (with English Translation).
International Preliminary Report on Patentability in International Patent Application No. PCT/JP2020/019037, dated Nov. 25, 2021, 25 pages.

(Continued)

Primary Examiner — Nizal S Chandrakumar
(74) Attorney, Agent, or Firm — Fish & Richardson P.C.

(57) ABSTRACT

The present application discloses a method and a compound that are useful for preparation of a compound of Formula (XI). Furthermore, the present application discloses the compound of Formula (XI) comprising a small amount of impurities.

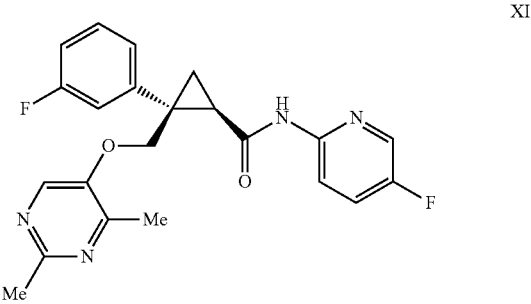

13 Claims, No Drawings

(56) References Cited

OTHER PUBLICATIONS

Search Report in European Patent Application No. 20806704.1, dated Dec. 2, 2022, 14 pages.
Notice of Allowance in Chinese Patent Application No. 202080030535.7, dated Aug. 23, 2024, 3 pages (with English Translation).
Notice of Allowance in European Patent Application No. 20806704.1, dated Aug. 23, 2024, 53 pages.
Office Action in Indian Patent Application No. 202147047143, dated Aug. 7, 2024, 3 pages.
Office Action in Mexican Patent Application No. MX/a/2021/012833, dated Jul. 15, 2024, 10 pages (with English Translation).
Office Action in Taiwanese Patent Application No. 113112699, dated Jul. 26, 2024, 8 pages (with English Translation).
Submission Document in Mexican Patent Application No. MX/a/2021/012833, dated Sep. 19, 2024, 19 pages (with English Translation).
Submission Document in Indian Patent Application No. 202147047143, dated Feb. 24, 2023, 19 pages.
Notice of Allowance in Japanese Patent Application No. P2021-519446, dated Apr. 16, 2024, 6 pages (with English Translation).
Notice of Allowance in Russian Patent Application No. 2021130621, dated Jun. 5, 2024, 37 pages (with English Translation).
Submission Document in Israeli Patent Application No. 287031, dated Mar. 13, 2023, 8 pages (with English Translation).
Submission Document in Korean Patent Application No. 10-2021-7033639, dated Mar. 2, 2023, 34 pages (with English Translation).
Submission Document in Russian Patent Application No. 2021130621, dated Mar. 7, 2023, 29 pages (with English Translation).
Office Action in Indian Patent Application No. 202147047143, dated Nov. 13, 2023, 8 pages.
Submission Document in Russian Patent Application No. 2021130621, dated Dec. 4, 2023, 18 pages (with English Translation).
Submission Document in Chinese Patent Application No. 202080030535.7, dated Feb. 24, 2022, 33 pages (with English Translation).
Submission Document in Russian Patent Application No. 2021130621, dated Apr. 24, 2024, 62 pages (with English Translation).
Office Action in Russian Application No. 2021130621, dated Sep. 12, 2023, 11 pages (with English translation).
Office Action in Japanese Patent Application No. P2021-519446, dated Feb. 6, 2024, 11 pages (with English translation).
Office Action in Russian Patent Application No. 2021130621, Jan. 31, 2024, 18 pages (with English translation).
Notice of Allowance in Taiwanese Patent Application No. 109115855, dated Jan. 9, 2024, 6 pages (with English Translation).
Office Action in Israeli Patent Application No. 287031, dated May 15, 2022, 5 pages (with English Translation).
Search Report in European Patent Application No. 20806704.1, dated Nov. 4, 2022, 15 pages.
Submission Document in European Patent Application No. 20806704.1, dated Nov. 14, 2022, 1 page.
Office Action in European Patent Application No. 20806704.1, dated Nov. 16, 2023, 4 pages.
Submission Document in European Patent Application No. 20806704.1, dated May 17, 2023, 126 pages.
Office Action in Chinese Patent Application No. 202080030535.7, dated Apr. 9, 2024, 14 pages (with English Translation).
Submission Document in Taiwanese Patent Application No. 109115855, Nov. 13, 2023, 16 pages (with English Translation).
Borgland et al., "Orexin A in the VTA is Critical for the Induction of Synaptic Plasticity and Behavioral Sensitization to Cocaine," Neurons, 2006, 49:589-601.
Chemelli et al., "Narcolepsy in orexin Knockout Mice: Molecular Genetics of Sleep Regulation," Cell, 1999, 98:437-451.
Fressigné et al., "A $C_3$ modified nucleotide. The difluorophosphonate function, a phosphate mimic, governs the conformational behaviour of the ribofuranose," Tetrahedron, 2005, 61:4769-4777.
Ida et al., "Possible Involvement of Orexin in the Stress Reaction in Rats," Biochemical and Biophysical Research Communications, 2000, 270:318-323.
International Search Report in International Patent Application No. PCT/JP2020/019037, dated Aug. 11, 2020, 12 pages (with English Translation).
Niggemann et al., "A General, Iterative, and Modular Approach toward Carbohydrate Libraries Based on Ruthenium-Catalyzed Oxidative Cyclizations," The Journal of Organic Chemistry, 2008, 73:7028-7036.
Oishi, "Protective Group in Organic Synthesis—Protection of Hydroxyl Group," Journal of Synthetic Organic Chemistry, Japan, 1978, 36(9):715-722 (with Partial Translation).
Sakurai et al., "Orexins and Orexin Receptors: A Family of Hypothalamic Neuropeptides and G Protein-Coupled Receptors that Regulate Feeding Behavior," Cell, 1998, 92:573-585.
Seki et al., "Synthesis of (2S,3R,11S, 12R,2'''R,11'''S,12'''R)-plakoside A, a prenylated and immunosuppressive marine galactosphingolipid with cyclopropane-containing alkyl chains," Tetrahedron Letters, 2001, 42:2357-2360.
Shoblock et al., "Selective blockade of the orexin-2 receptor attenuates ethanol self-administration, place preference, and reinstatement," Psychopharmacology, 2010, 215:191-203.
Stolle et al., "Palladium(0) catalyzed substitution reactions of cyclopropyl group containing allylic esters," Tetrahedron Letters, 1990, 31(32):4593-4596.
Winrow et al., "Orexin receptor antagonism prevents transcriptional and behavioral plasticity resulting from stimulant exposure," Neuropharmacology, 2010, 58:185-194.
Wuts' Greene's Protective Groups in Organic Synthesis, 5th ed., John Wiley & Sons, Inc., Oct. 2014, cover page & pp. 271-283.
Yoshida et al., "Design, synthesis, and structure-activity relationships of a series of novel N-aryl-2-phenylcyclopropanecarboxamide that are potent and orally active orexin receptor antagonists," Bioorganic & Medicinal Chemistry, 2014, 22:6071-6088.
Yoshida et al., "Discovery of (1R,2S)-2-{[(2,4-Dimethylpyrimidin-5-yl)oxy]methyl}-2-(3-fluorophenyl)-N-(5-fluoropyridin-2-yl)cyclopropanecarboxamide (E2006): A Potent and Efficacious Oral Orexin Receptor Antagonist," Journal of Medicinal Chemistry, 2015, 58:4648-4664.
Submission Document in European Patent Application No. 20806704.1, dated Feb. 23, 2024, 110 pages.
Submission Document in Taiwanese Patent Application No. 109115855, dated Mar. 3, 2023, 30 pages (with English Translation).
Submission Document in Chinese Patent Application No. 202080030535.7, dated Jul. 10, 2024, 34 pages (with English Translation).
Office Action in Taiwanese Patent Application No. 109115855, dated Aug. 22, 2023, 16 page (with English Translation).
Submission Document in Indian Patent Application No. 202147047143, dated May 6, 2024, 85 pages.
Notice of Allowance in Mexican Patent Application No. MX/a/2021/012833, dated Jan. 10, 2025, 6 pages (with English Translation).
Office Action in Canadian Patent Application No. 3136188, dated Dec. 23, 2024, 4 pages.
Office Action in Japanese Patent Application No. P2024-078557, dated Dec. 3, 2024, 12 pages (with English translation).
Office Action in Mexican Patent Application No. MX/a/2021/012833, dated Oct. 11, 2024, 6 pages (with English translation).
Office Action in Russian Patent Application No. 2024118634, dated Dec. 17, 2024, 14 pages (with English translation).
Submission Document in Japanese Patent Application No. P2024-078557, dated Jan. 29, 2025, 12 pages (with English Translation).
Submission Document in Mexican Patent Application No. MX/a/2021/012833, dated Dec. 3, 2024, 13 pages (with English translation).
Extended European Search Report in European Patent Application No. 24222228.9, dated Apr. 1, 2025, 7 pages.
Office Action in Japanese Patent Application No. P2024-078557, dated Apr. 15, 2025, 7 pages (with English Translation).
Office Action in Korean Patent Application No. 10-2021-7033639, dated Mar. 12, 2025, 9 pages (with English Translation).

(56) References Cited

OTHER PUBLICATIONS

Submission Document in Canadian Patent Application No. 3136188, dated Apr. 9, 2025, 25 pages.
Submission Document in Indian Patent Application No. 202147047143, dated Mar. 17, 2025, 32 pages.
Submission Document in Indian Patent Application No. 202147047143, dated May 28, 2025, 1 page.
Submission Document in Korean Patent Application No. 10-2021-7033639, dated Apr. 11, 2025, 30 pages (with English Translation).
Office Action in Indian Patent Application No. 202147047143, dated Jun. 13, 2025, 3 pages.

\* cited by examiner

METHOD AND COMPOUND USEFUL IN PREPARATION OF OREXIN-2 RECEPTOR ANTAGONIST, AND LEMBOREXANT HAVING FEW IMPURITIES

CROSS-REFERENCE TO RELATED APPLICATIONS

This application is a National Stage application under 35 U.S.C. § 371 of International Application No. PCT/JP2020/019037, having an International Filing Date of May 13, 2020, which claims priority to Japanese Application Serial No. 2019-238904, filed on Dec. 27, 2019 and Japanese Application Serial No. 2019-092254, filed on May 15, 2019. The disclosures of the above-referenced prior applications are considered part of the disclosure of this application, and are incorporated in their entirety into this application.

TECHNICAL FIELD

The present invention relates to a compound and a method that are useful for preparation of Lemborexant which is useful as an orexin-2 receptor antagonist. Furthermore, the present invention relates to Lemborexant comprising a small amount of impurities.

BACKGROUND ART

Orexin receptors are G protein-coupled receptors that are dominantly observed in the brain. The intrinsic ligands of orexin receptors, orexin-A and orexin-B, are expressed by neurons that are localized in the hypothalamic area. Orexin-A is a peptide of 33 amino acids, and orexin-B is composed of 28 amino acids (Sakurai T. et al., Cell, 1998, Vol. 92, pp. 573 to 585). There are two subtypes of orexin receptors, OX1 and OX2, and OX1 preferentially binds to orexin-A, while OX2 binds to both orexin-A and orexin-B. It has been suggested (by Sakurai et al., mentioned above) that orexins stimulate food consumption in rats and orexin signaling can play a role in principal feedback mechanisms for adjusting eating behaviors. Orexins have also been observed to control the arousal-sleep state (Chemelli R. M. et al., Cell, 1999, Vol. 98, pp. 437 to 451). Orexins are also capable of playing a role in brain changes accompanied by opioid and nicotine addiction (S. L. Borgland et al., Neuron, 2006, Vol. 49, pp. 598 to 601; C. J. Winrow et al. Neuropharmacology, 2010, Vol. 58, pp. 185 to 194) and ethanol addiction (J. R. Shoblock et al., Psychopharmacology, 2011, Vol. 215, pp. 191 to 203). Furthermore, it has been suggested that orexins play a role in some of stress reactions (T. Ida et al., Biochem. Biophys. Res. Commun., 2000, Vol. 270, pp. 318 to 323).

It is known that compounds such as (1R,2S)-2-(((2,4-dimethylpyrimidin-5-yl)oxy)methyl)-2-(3-fluorophenyl)-N-(5-fluoropyridin-2-yl)cyclopropanecarboxamide (Lemborexant) are potent orexin receptor antagonists and these compounds are useful for treatments for sleep disorders such as insomnia and other therapeutic applications.

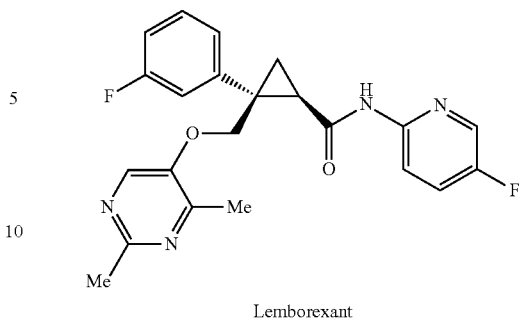

Lemborexant

CITATION LIST

Patent Literature

[Patent Literature 1] WO 2012/039371
[Patent Literature 2] WO 2013/123240

Non-Patent Literature

[Non-Patent Literature 1] Sakurai T. et al., Cell, 1998, Vol. 92, pp. 573 to 585
[Non-Patent Literature 2] Chemelli R. M. et al., Cell, 1999, Vol. 98, pp. 437 to 451
[Non-Patent Literature 3] S. L. Borgland et al., Neuron, 2006, Vol. 49, pp. 598 to 601
[Non-Patent Literature 4] C. J. Winrow et al. Neuropharmacology, 2010, Vol. 58, pp. 185 to 194
[Non-Patent Literature 5] J. R. Shoblock et al., Psychopharmacology, 2011, Vol. 215, pp. 191 to 203
[Non-Patent Literature 6] T. Ida et al., BioChem. Biophys. Res. Commun., 2000, Vol. 270, pp. 318 to 323

SUMMARY OF INVENTION

Technical Problem

As a method for producing Lemborexant, the method described in Patent Literature 1 is known; however, in Patent Literature 1, Lemborexant is synthesized from a compound Prep 14-2 of Production Example 14 through a compound Prep 14-3.

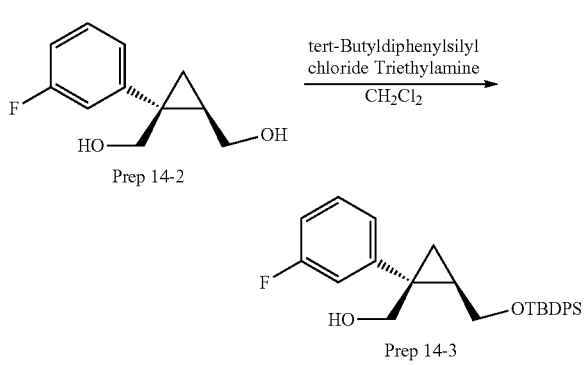

Since the yield is low in this production method, there is still a problem with the use of the above-described production method for industrial production.

As a method for producing Lemborexant, the method described in Patent Literature 2 is known; however, in Patent Literature 2, Lemborexant is synthesized from a compound 5 through a compound 6 by acetylation in which an enzyme is used.

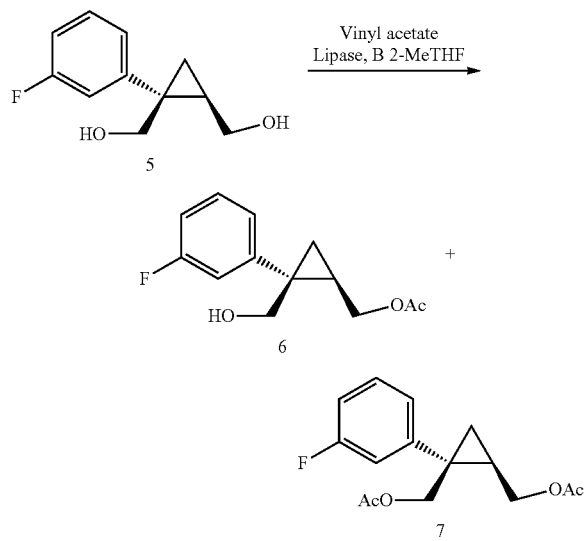

In this production method, since it is necessary to take the enzyme remaining during washing of a facility into account, there is still a problem with the use of the production method for industrial production.

In addition, the present inventors found that, in the production of Lemborexant, compounds of Formula VI, Formula IX, Formula X, Formula XII, Formula XIII, Formula XIV and Formula XV are contained as impurities.

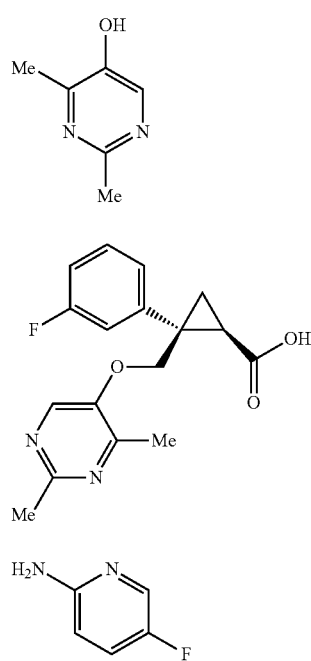

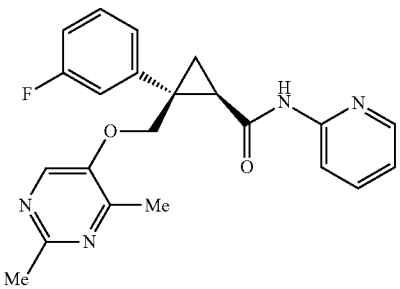

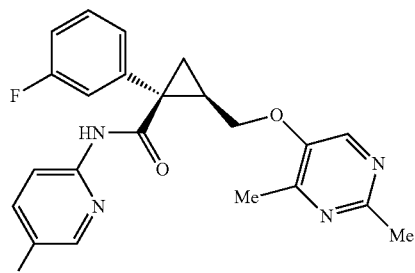

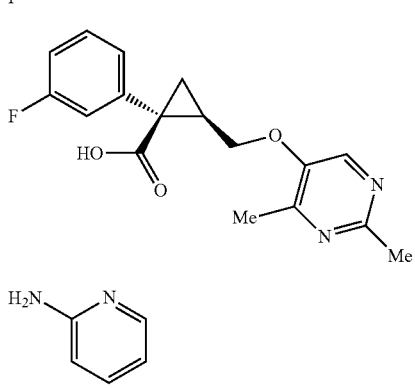

There is a need for a synthesis method and an intermediate that are useful in the preparation of Lemborexant, which is a useful pharmaceutical. Therefore, an objective of the present application is to provide such a synthesis method and such an intermediate. In addition, there is another need for Lemborexant comprising a small amount of impurities, which is a useful pharmaceutical. Therefore, another objective of the present application is to provide Lemborexant comprising a small amount of impurities.

Solution to Problem

In the present specification, a compound and a method that are useful for preparation of Lemborexant, which is useful as an orexin-2 receptor antagonist, are provided. Furthermore, Lemborexant comprising a small amount of impurities is provided.

There is provided a method for producing a compound of Formula III:

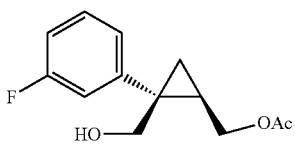

III comprising:
  a) adding a Grignard reagent to a mixture comprising a compound of Formula II:

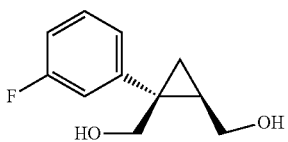

II toluene and tetrahydrofuran and
  b) adding the mixture to a mixture comprising acetyl chloride and ethyl acetate.

In one embodiment, the Grignard reagent is cyclohexylmagnesium chloride.

There is provided a method for producing a compound of Formula XI:

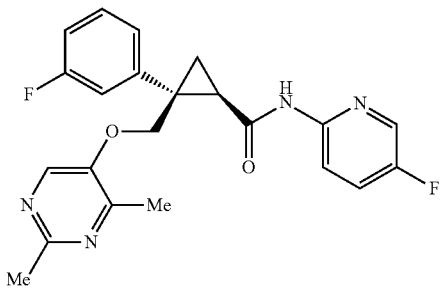

XI comprising:
  a manufacturing process for producing the compound of Formula III described above.

There is provided the method for producing a compound of Formula XI described above, comprising:
stirring a mixture of
  i) a compound of Formula IX:

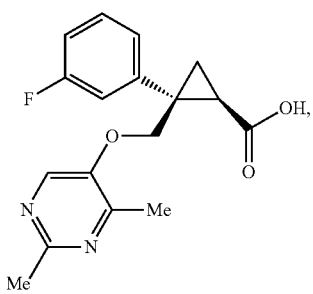

IX ii) a compound of Formula X:

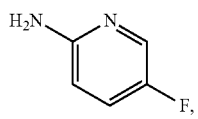

X iii) ethyl acetate,
  iv) N,N-diisopropylethylamine, and
  v) 1-propanephosphonic acid
at a temperature of 60° C. to 80° C.

There is provided a method for producing the compound of Formula IX:

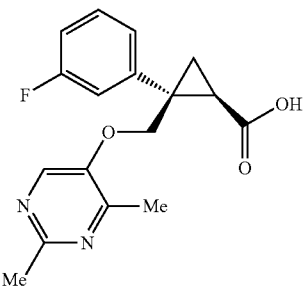

IX comprising:
  producing the compound of Formula III described above.

There is provided a method for producing the compound of Formula IX:

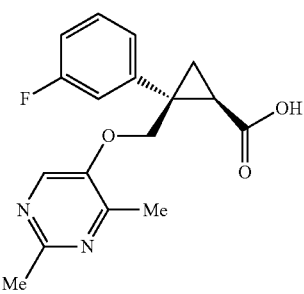

IX comprising:
  allowing a compound of Formula VII:

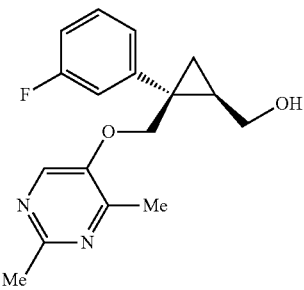

VII to react with an oxidant.

In one embodiment, the step of allowing the compound of Formula VII to react with the oxidant is performed by sequentially adding sodium hypochlorite and sodium chlorite as the oxidant.

There is provided a method for producing the compound of Formula IX:

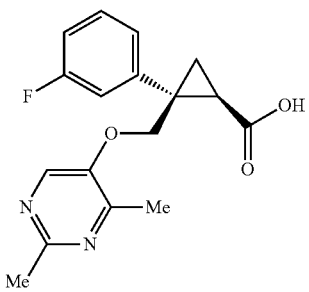

comprising:
a) oxidizing a compound of Formula VII:

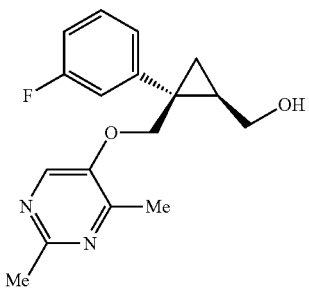

with sodium hypochlorite to produce an aldehyde of Formula VIE:

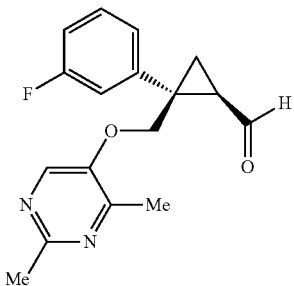

and
b) oxidizing the aldehyde with sodium chlorite.

In one embodiment, the oxidation in the step a) is catalyzed with an effective amount of 2,2,6,6-tetramethylpiperidin 1-oxyl (TEMPO).

There is provided a method for producing a compound of Formula VII:

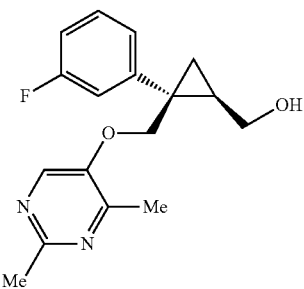

comprising:
a manufacturing process for producing the compound of Formula III described above, and
adding a sodium hydroxide aqueous solution to a compound of Formula V:

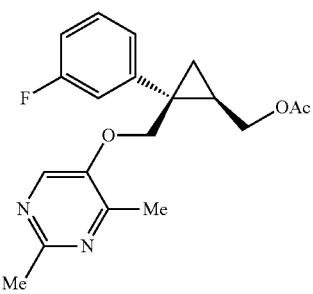

and stirring both at a temperature of 30° C. to 50° C.

There is provided a method for producing the compound of Formula V:

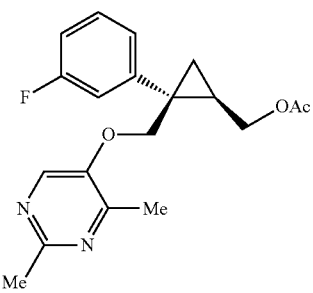

comprising:
a) adding potassium tert-butoxide to a mixture of
i) a compound of Formula VI:

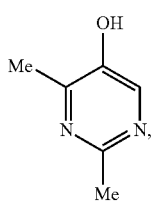

ii) N-methylpyrrolidone, and
iii) acetonitrile and
stirring the mixture at a temperature of 40° C. to 70° C., and
b) stirring a mixture obtained by adding
i) a compound of Formula IV:

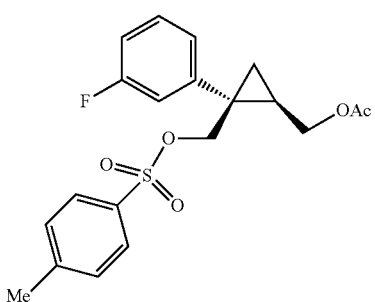

IV to the mixture at a temperature of 40° C. to 70° C.

There is provided a method for producing the compound of Formula IV:

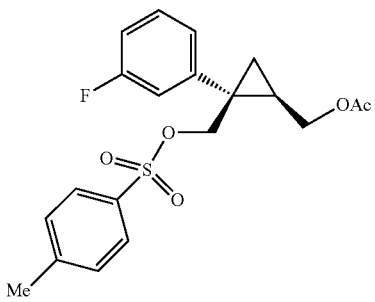

IV comprising:
adding a mixture of ii) p-toluenesulfonyl chloride, toluene and acetonitrile to a composition comprising i) a compound of Formula III:

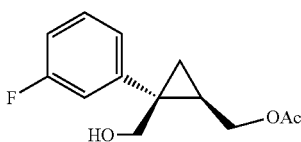

III produced by the method described above, toluene, triethylamine and 1-methylimidazole.

There is provided a method for producing the compound of Formula II:

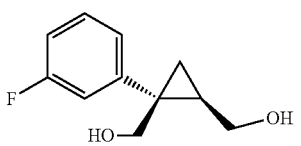

II comprising:
adding methanol to a composition comprising a compound of Formula I:

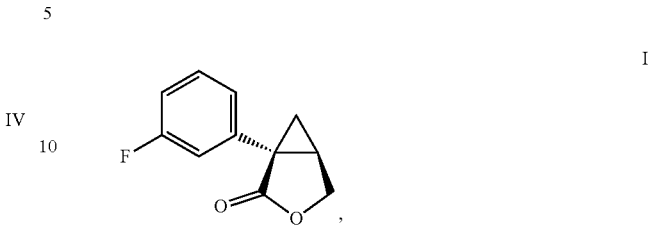

I toluene, tetrahydrofuran and sodium borohydride.

There is provided a compound of Formula XI, wherein a content of a compound of Formula XII is 0.10 mass % or less.

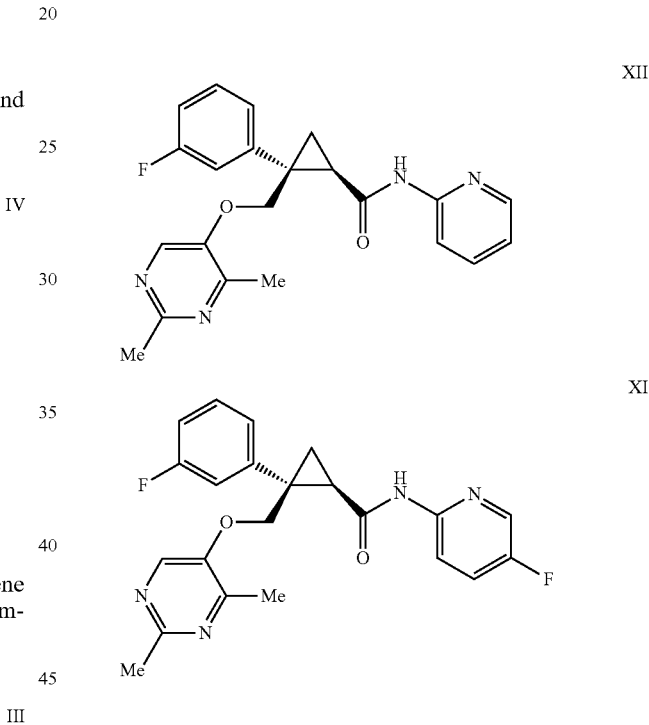

XII

XI

There is provided the compound of Formula XI described above, wherein the content of the compound of Formula XII is determined by high performance liquid chromatography (HPLC).

There is provided a compound of Formula XI, wherein a content of all related substances including compounds of Formula VI, Formula IX, Formula X, Formula XIII, Formula XIV and Formula XV is 1.0 mass % or less.

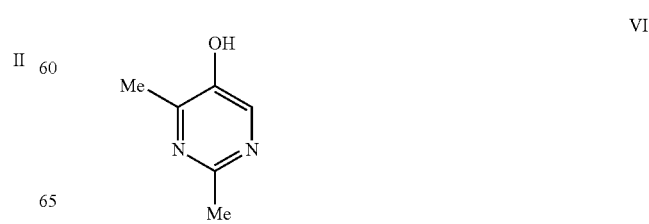

VI

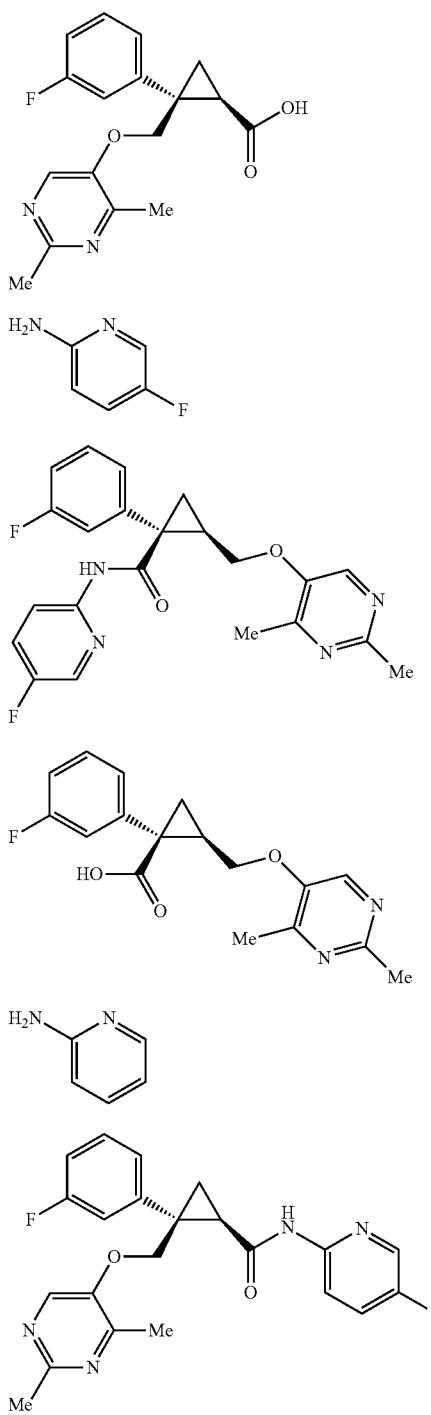
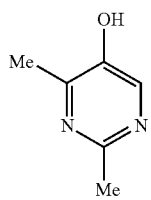
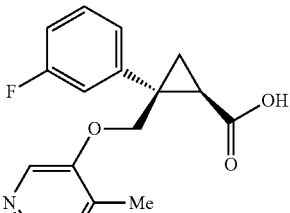
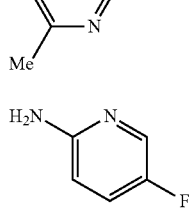
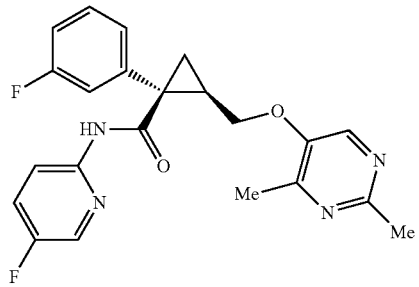
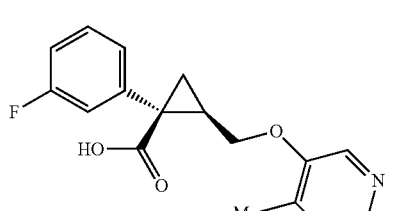
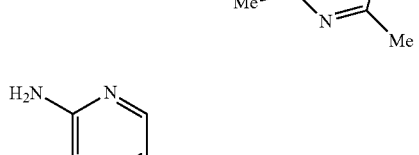
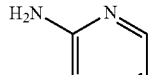
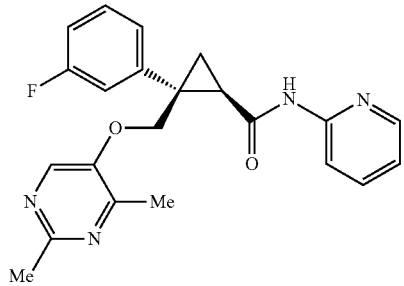

There is provided the compound of Formula XI described above, wherein the content of all related substances including the compounds of Formula VI, Formula IX, Formula X, Formula XIII, Formula XIV and Formula XV is determined by high performance liquid chromatography (HPLC).

There is provided a compound of Formula XI, wherein a content of a compound of Formula XII is 0.10 mass % or less, and a content of all related substances including compounds of Formula VI, Formula IX, Formula X, Formula XIII, Formula XIV and Formula XV is 1.0 mass % or less.

-continued

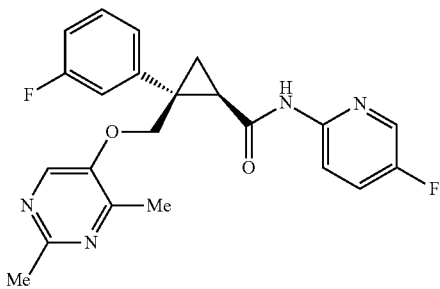

XI

There is provided the compound of Formula XI described above, wherein the contents of the compound of Formula XII and all related substances including the compounds of Formula VI, Formula IX, Formula X, Formula XIII, Formula XIV and Formula XV are determined by high performance liquid chromatography (HPLC).

There is provided a compound of Formula XI, wherein a content of a compound of Formula VI is 0.05 mass % or less.

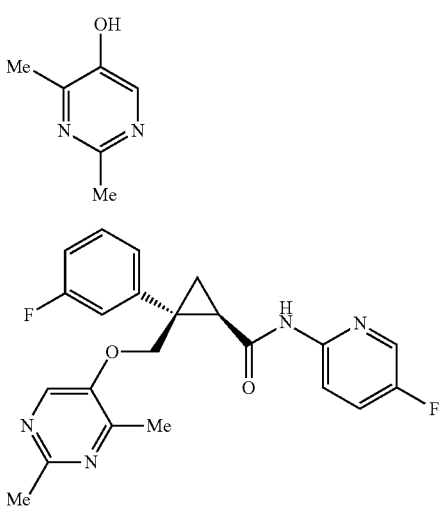

VI

XI

There is provided the compound of Formula XI described above, wherein the content of the compound of Formula VI is determined by high performance liquid chromatography (HPLC).

There is provided a compound of Formula XI, wherein a content of a compound of Formula IX is 0.05 mass % or less.

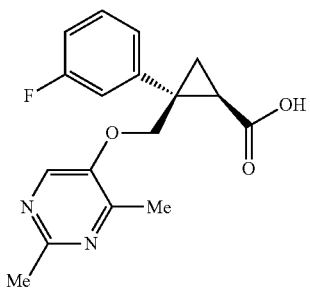

IX

-continued

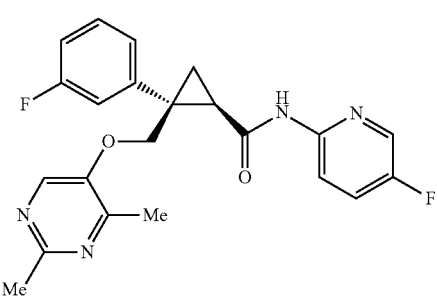

XI

There is provided the compound of Formula XI described above, wherein the content of the compound of Formula IX is determined by high performance liquid chromatography (HPLC).

There is provided a compound of Formula XI, wherein a content of a compound of Formula X is 0.05 mass % or less.

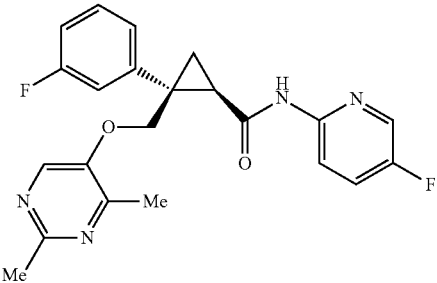

X

XI

There is provided the compound of Formula XI described above, wherein the content of the compound of Formula X is determined by high performance liquid chromatography (HPLC).

There is provided a compound of Formula XI, wherein a content of a compound of Formula XIII is 0.05 mass % or less.

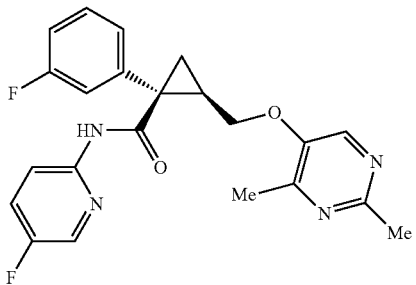

XIII

-continued

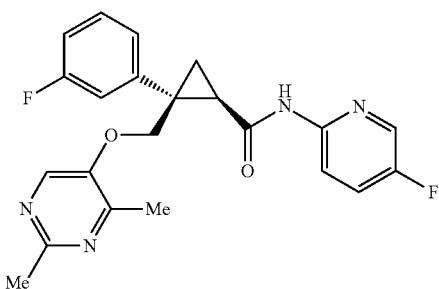
XI

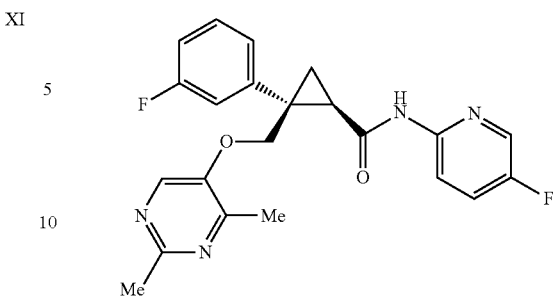
XI

There is provided the compound of Formula XI described above, wherein the content of the compound of Formula XIII is determined by high performance liquid chromatography (HPLC).

There is provided a compound of Formula XI, wherein a content of a compound of Formula XIV is 0.05 mass % or less.

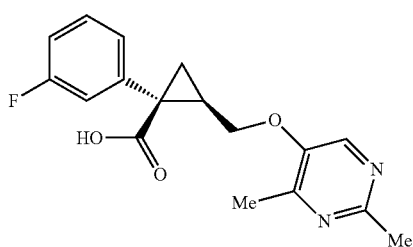
XIV

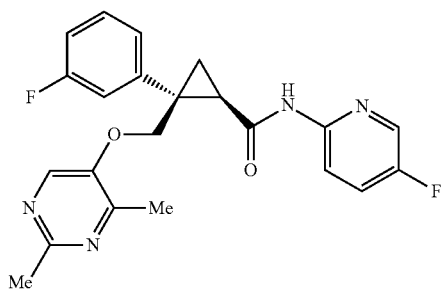
XI

There is provided the compound of Formula XI described above, wherein the content of the compound of Formula XIV is determined by high performance liquid chromatography (HPLC).

There is provided a compound of Formula XI, wherein a content of a compound of Formula XV is 0.05 mass % or less.

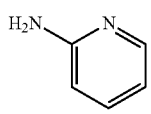
XV

There is provided the compound of Formula XI described above, wherein the content of the compound of Formula XV is determined by high performance liquid chromatography (HPLC).

There is provided the compound of Formula XI described above, wherein a content of the compound of Formula XI is 97.0 mass % or more.

There is provided the compound of Formula XI described above, wherein the content of the compound of Formula XI is determined by high performance liquid chromatography (HPLC).

There is provided a compound comprising a compound of Formula XI and a compound of Formula XII, wherein a content of the compound of Formula XI is 97.0 mass % or more, and a content of the compound of Formula XII is 0.10 mass % or less.

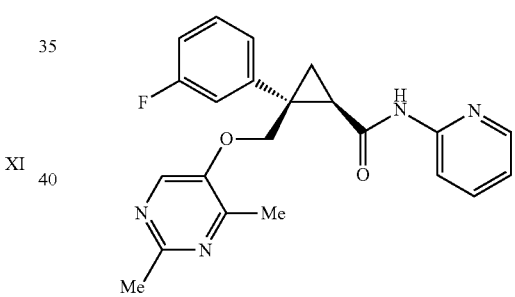
XII

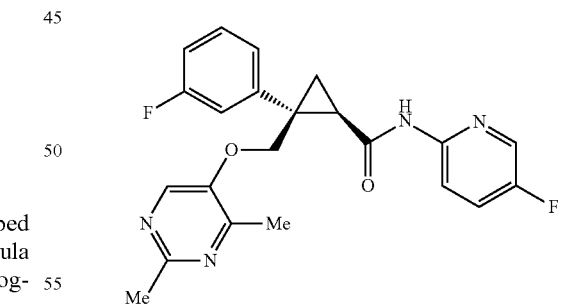
XI

There is provided the compound described above, wherein the contents of the compound of Formula XI and the compound of Formula XII are determined by high performance liquid chromatography (HPLC).

There is provided a compound comprising a compound of Formula XI, a compound of Formula XII and all related substances including compounds of Formula VI, Formula IX, Formula X, Formula XIII, Formula XIV and Formula XV, wherein a content of the compound of Formula XI is 97.0 mass % or more, a content of the compound of Formula XII is 0.10 mass % or less, and a content of all related substances including the compounds of Formula VI, Formula IX, Formula X, Formula XIII, Formula XIV and Formula XV is 1.0 mass % or less.

VI

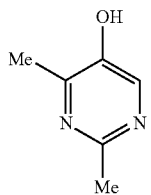

IX

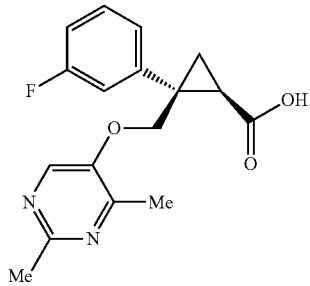

X

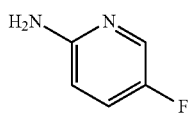

XIII

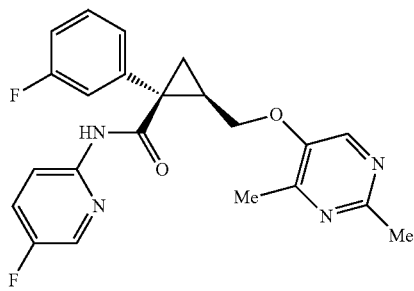

XIV

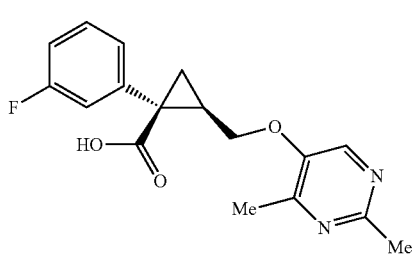

XV

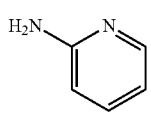

XII

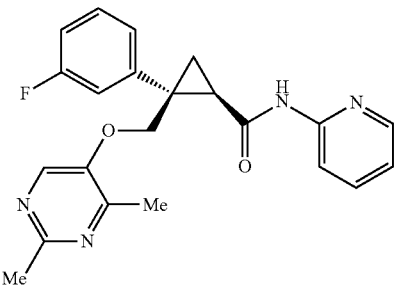

XI

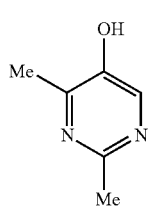

There is provided the compound described above, wherein the contents of the compound of Formula XI, the compound of Formula XII, and all related substances including the compounds of Formula VI, Formula IX, Formula X, Formula XIII, Formula XIV and Formula XV are determined by high performance liquid chromatography (HPLC).

There is provided a compound comprising a compound of Formula XI and a compound of Formula VI, wherein a content of the compound of Formula XI is 97.0 mass % or more, and a content of the compound of Formula VI is 0.05 mass % or less.

VI

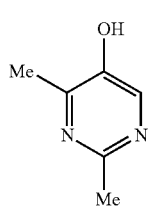

XI

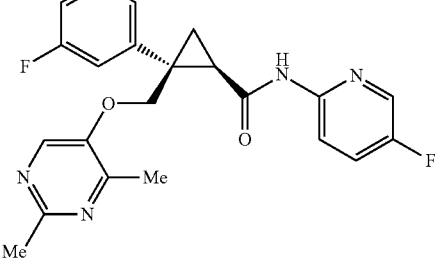

There is provided the compound described above, wherein the contents of the compound of Formula XI and the compound of Formula VI are determined by high performance liquid chromatography (HPLC).

There is provided a compound of Formula comprising a compound of Formula XI and a compound of Formula IX, wherein a content of the compound of Formula XI is 97.0 mass % or more, and a content of the compound of Formula IX is 0.05 mass % or less.

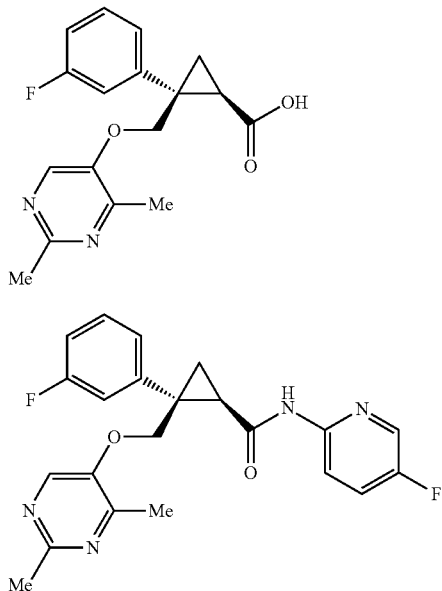

IX

XI

There is provided the compound described above, wherein the contents of the compound of Formula XI and the compound of Formula IX are determined by high performance liquid chromatography (HPLC).

There is provided a compound comprising a compound of Formula XI and a compound of Formula X, wherein a content of the compound of Formula XI is 97.0 mass % or more, and a content of the compound of Formula X is 0.05 mass % or less.

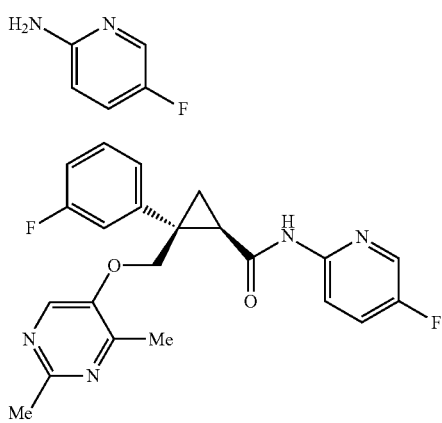

X

XI

There is provided the compound described above, wherein the contents of the compound of Formula XI and the compound of Formula X are determined by high performance liquid chromatography (HPLC).

There is provided a compound comprising a compound of Formula XI and a compound of Formula XIII, wherein a content of the compound of Formula XI is 97.0 mass % or more, and a content of the compound of Formula XIII is 0.05 mass % or less.

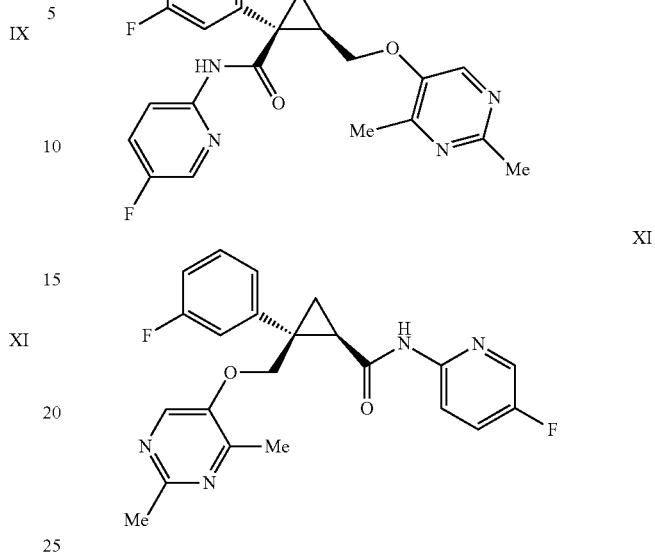

XIII

XI

There is provided the compound described above, wherein the contents of the compound of Formula XI and the compound of Formula XIII are determined by high performance liquid chromatography (HPLC).

There is provided a compound comprising a compound of Formula XI and a compound of Formula XIV, wherein a content of the compound of Formula XI is 97.0 mass % or more, and a content of the compound of Formula XIV is 0.05 mass % or less.

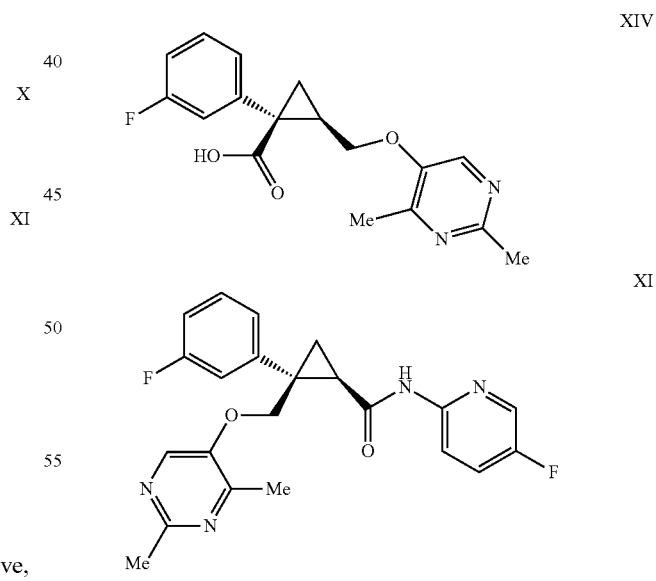

XIV

XI

There is provided the compound described above, wherein the contents of the compound of Formula XI and the compound of Formula XIV are determined by high performance liquid chromatography (HPLC).

There is provided a compound comprising a compound of Formula XI and a compound of Formula XV, wherein a content of the compound of Formula XI is 97.0 mass % or more, and a content of the compound of Formula XV is 0.05 mass % or less.

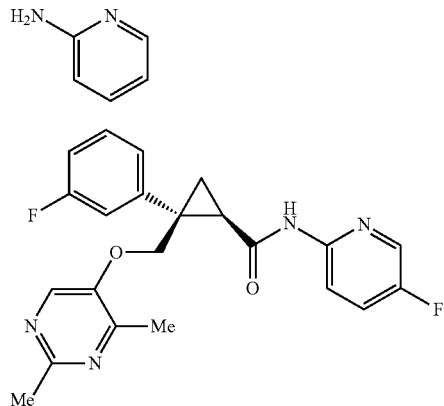

There is provided the compound described above, wherein the contents of the compound of Formula XI and the compound of Formula XV are determined by high performance liquid chromatography (HPLC).

Advantageous Effects of Invention

The present invention is capable of providing a synthesis method and an intermediate that are useful in preparation of an orexin-2 receptor antagonist. Furthermore, the present invention is capable of providing Lemborexant comprising a small amount of impurities.

DESCRIPTION OF EMBODIMENTS

Hereinafter, the meanings of reference signs, terminologies and the like used in the present specification will be described, and the present specification will be described in detail.

In the present specification, the structural formula of a compound is not limited to the formula expressed for convenience, and the compound may form a salt. Furthermore, the compound may have crystal polymorphism and, similarly, may be any of single crystal forms or a mixture thereof with no limitations and may be a hydrate or a solvate other than an anhydride, all of which are included in the present invention.

In the present specification, unless particularly otherwise described, specific examples of a salt include a hydrohalic acid salt (for example, hydrofluoric acid salt, hydrochloride, hydrobromide, hydroiodide or the like), an inorganic salt (for example, sulfate, nitrate, perchlorate, phosphate, carbonate, bicarbonate or the like) and the like.

In one embodiment, a compound that is described in the present specification can be provided as a salt, for example, a pharmaceutically acceptable salt. "A pharmaceutically acceptable salt" refers to a salt that retains a desired biological activity of the parent compound, but imparts no undesirable toxicological actions. Specific examples of the pharmaceutically acceptable salt include inorganic acid salts (sulfate, nitrate, perchlorate, phosphate, carbonate, bicarbonate, hydrofluoric acid salt, hydrochloride, hydrobromide, hydroiodide and the like), organic carboxylates (acetate, oxalate, maleate, tartrate, fumarate, citrate and the like), organic sulfonates (methanesulfonate, trifluoromethanesulfonate, ethanesulfonate, benzene sulfonate, toluene sulfonate, camphor sulfonate and the like), amino acid salts (aspartate, glutamate and the like), quaternary amine salts, alkali metal salts (sodium salts, potassium salts and the like) and alkaline earth metal salts (magnesium salts, calcium salts and the like).

The present invention includes the isotope-labelled compounds of a compound that is described in the specification and production methods in which the compound is used. The isotope-labelled compound is the same as the compound that is described in the specification except that one or more atoms are replaced with an atom having a different atomic mass or mass number from the atomic mass or mass number that generally occurs in nature. An isotopic element that can be incorporated into the compound of the present invention is, for example, the isotopic element of hydrogen, carbon, nitrogen, oxygen, fluorine, chlorine, phosphorus, sulfur and iodine, and examples thereof include $^2H$, $^3H$, $^{11}C$, $^{14}C$, $^{13}N$, $^{15}O$, $^{18}F$, $^{32}P$, $^{35}S$, $^{123}I$, $^{125}I$ and the like. The compound of the present invention containing such an isotopic element and/or other isotopic elements and a pharmaceutically acceptable derivative (for example, a salt) of the compound are also included in the scope of the present claims.

The isotope-labelled compound of the present invention, for example, a compound into which a radioactive isotope such as $^3H$ and/or $^{14}C$, has been incorporated is useful for tissue distribution assay of pharmaceuticals and/or matrixes. $^3H$ and $^{14}C$ are considered to be useful due to their easiness in preparation and detection. Isotopic elements $^{11}C$ and $^{18}F$ are considered to be useful for positron emission tomography (PET), an isotopic element $^{125}I$ is considered to be useful for single photon emission computed tomography (SPECT), and these isotopic elements are all useful for brain imaging. Substitution with a heavier isotopic element such as $^2H$ allows a certain type of therapeutic advantage such as an increase in in vivo half-life or a decrease in a required dose attributed to higher metabolic stability and is thus considered to be useful in certain situations.

A structure shown in the present specification means to also include all enantiomeric, diastereomeric and geometric (or conformational) forms of the structure; for example, R-type and S-type configurations regarding each asymmetric center, (Z)-type and (E)-type double-bond isomers and (Z)-type and (E)-type conformational isomers. Therefore, single stereochemical isomers, enantiomers, diastereomers and geometric (or conformational) mixtures of the compound of the present invention are within the scope of the present invention. Unless otherwise described, tautomeric forms of the compound of the present invention are all within the scope of the present invention.

"A compound" in the present specification refers to a compound that comprises 90 mass % or more of the compound itself and may comprise a starting material or a possible by-product in production process of the compound as a related substance. For example, "the compound of Formula XI" comprises 90 mass % or more of the compound of Formula XI and may comprise a starting material, a possible by-product or the like in each production process of the compound of Formula VI, the compound of Formula IX, the compound of Formula X, the compound of Formula XII, the compound of Formula XIII, the compound of Formula XIV or the compound of Formula XV. Therefore, "a compound" in the present specification may comprise a by-product or the like as impurities and thus also has an aspect of "a composition". Here, in the case of showing the content of an impurity such as the compound of Formula VI, the compound of Formula IX, the compound of Formula X, the compound of Formula XII, the compound of Formula XIII, the compound of Formula XIV or the compound of Formula XV, the content is based on the total mass of the compound of Formula XI.

"The content of all related substances" in the present specification refers to the total amount (mass %) of related substances including Formula VI, Formula IX, Formula X, Formula XIII, Formula XIV or Formula XV.

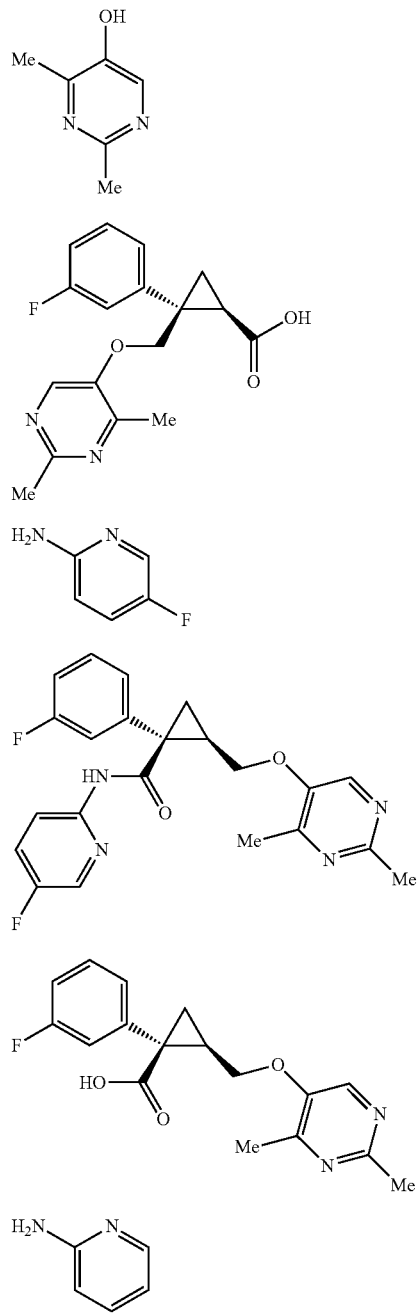

In the present specification, a compound (for example, an intermediate compound) useful for the preparation of (1R, 2S)-2-(((2,4-dimethylpyrimidin-5-yl)oxy)methyl)-2-(3-fluorophenyl)-N-(5-fluoropyridin-2-yl)cyclopropanecarboxamide (Lemborexant), which is known as a potent orexin receptor antagonist and useful for treatments for sleep disorders such as insomnia and other therapeutic applications, and a production method thereof are provided. Furthermore, in the present specification, Lemborexant comprising a small amount of impurities is provided.

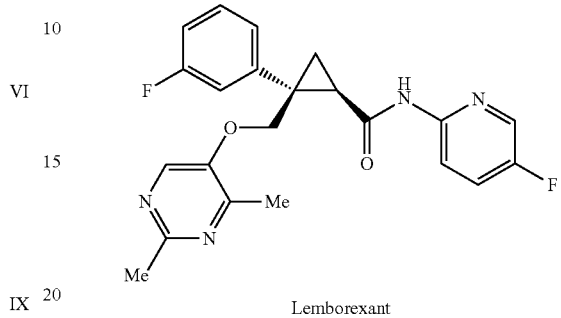

Lemborexant

There is provided a method for producing a compound of Formula III:

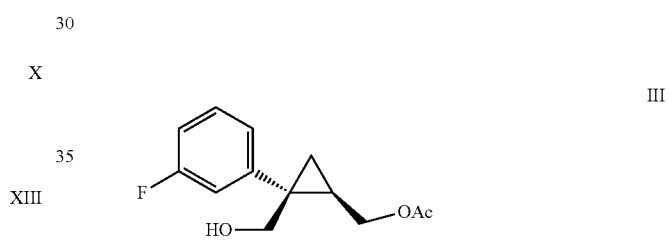

comprising:
a) adding a Grignard reagent to a mixture comprising a compound of Formula II:

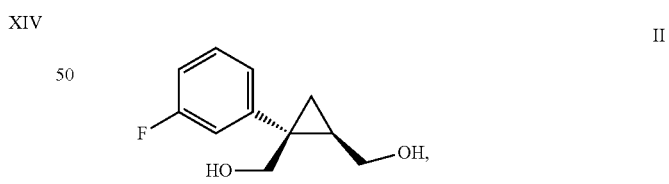

toluene and tetrahydrofuran and
b) adding the mixture to a mixture comprising acetyl chloride and ethyl acetate.

In the above-described method, the step a) may be performed at 60° C. or lower, and the step b) may be performed at 20° C. or lower.

In one embodiment, the Grignard reagent is cyclohexylmagnesium chloride.

There is provided a method for producing a compound of Formula XI:

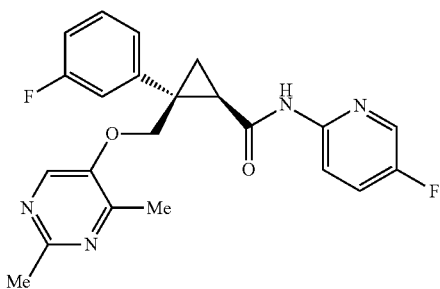

XI

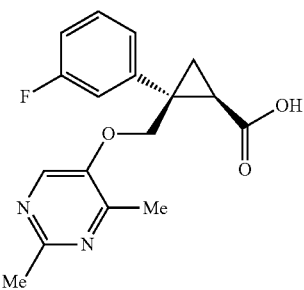

IX comprising:
  producing the compound of Formula III described above.
  There is provided the method for producing a compound of Formula XI described above, comprising
  stirring a mixture of
  i) a compound of Formula IX:

comprising:
  producing the compound of Formula III described above.
  There is provided a method for producing the compound of Formula IX:

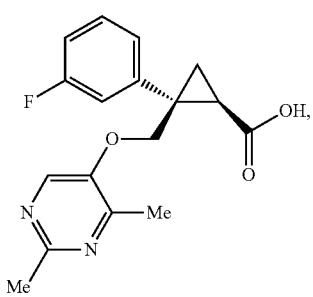

IX

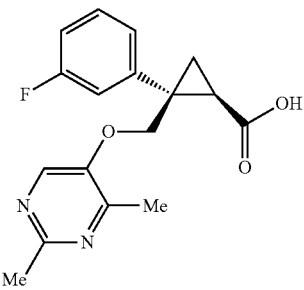

IX ii) a compound of Formula X:

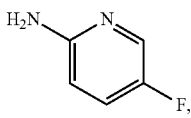

X comprising:
  allowing a compound of Formula VII

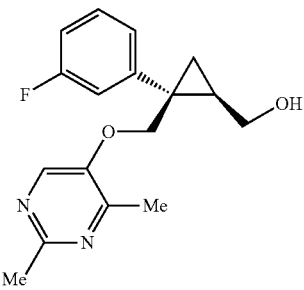

VII to react with an oxidant.

In the above-described method, a reaction solvent may be a liquid mixture of toluene and water, and a reaction temperature may be 35° C. or lower.

In one embodiment, the step of reacting the compound of Formula VII with the oxidant is performed by sequentially adding sodium hypochlorite and sodium chlorite as the oxidant.

There is provided a method for producing the compound of Formula IX:

iii) ethyl acetate,
iv) N,N-diisopropylethylamine, and
v) 1-propanephosphonic acid
at a temperature of 60° C. to 80° C.

In the above-described method, a reaction solvent may be ethyl acetate, and the temperature of the step of stirring a mixture may be 70° C.

There is provided a method for producing the compound of Formula IX:

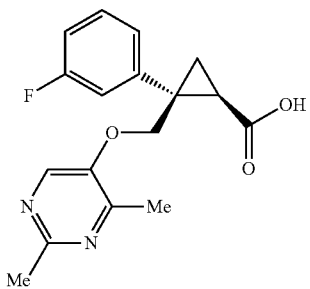

comprising:

a) oxidizing a compound of Formula VII:

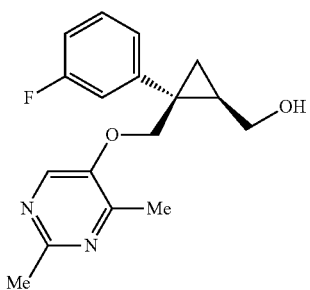

with sodium hypochlorite to produce an aldehyde of Formula VIII:

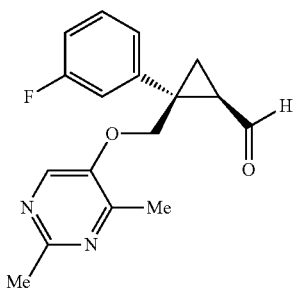

and b) oxidizing the aldehyde with sodium chlorite.

In the above-described method, a reaction solvent in the step a) and the step b) may be a liquid mixture of toluene and water, and a reaction temperature may be 25° C. or lower.

In one embodiment, the oxidation in the step a) is catalyzed with an effective amount of 2,2,6,6-tetramethylpiperidin-1-oxyl (TEMPO).

There is provided a method for producing a compound of Formula VII:

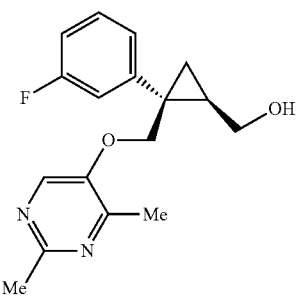

comprising:

a manufacturing process for producing the compound of Formula III described above and adding a sodium hydroxide aqueous solution to a compound of Formula V:

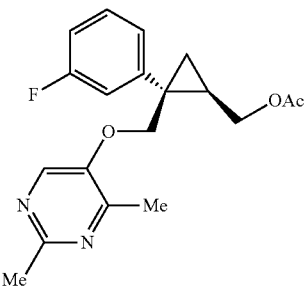

and stirring both at a temperature of 30° C. to 50° C.

In the above-described method, a reaction solvent may be a liquid mixture of toluene, N-methylpyrrolidone, acetonitrile and water, and a reaction temperature may be 40° C.

There is provided a method for producing the compound of Formula V:

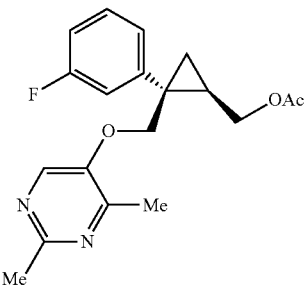

comprising:
  a) adding potassium tert-butoxide to a mixture of
    i) a compound of Formula VI:

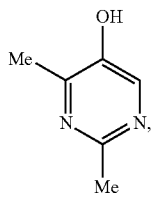

VI ii) N-methylpyrrolidone, and
    iii) acetonitrile and
    stirring both at a temperature of 40° C. to 70° C. and
  b) stirring a mixture obtained by adding
    i) a compound of Formula IV:

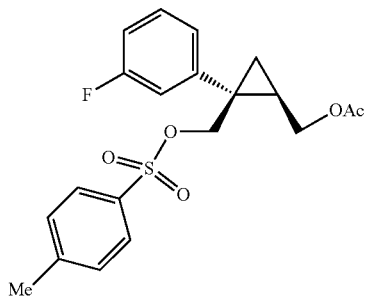

IV to the mixture at a temperature of 40° C. to 70° C.

In the above-described method, a reaction solvent in the step a) may be a liquid mixture of N-methylpyrrolidone and acetonitrile, a reaction temperature may be 50° C., a reaction solvent in the step b) may be a liquid mixture of toluene, N-methylpyrrolidone and acetonitrile, and a reaction temperature may be 50° C.

There is provided a method for producing the compound of Formula IV:

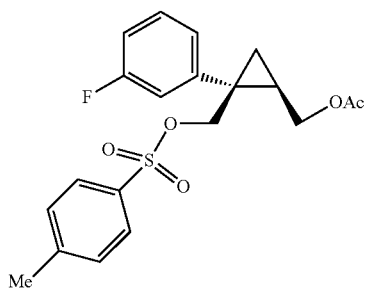

IV comprising:
  adding a mixture of ii) p-toluenesulfonyl chloride, toluene and acetonitrile to a composition comprising
    i) a compound of Formula III:

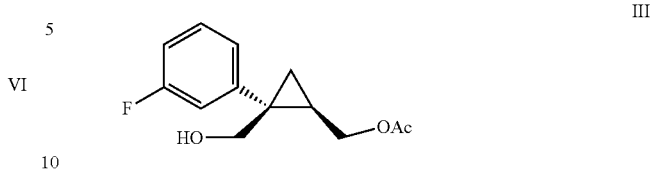

III produced by the method described above, toluene, triethylamine and 1-methylimidazole.

In the above-described method, a reaction solvent may be a liquid mixture of toluene and acetonitrile, and a reaction temperature may be 8° C.

There is provided a method for producing the compound of Formula II:

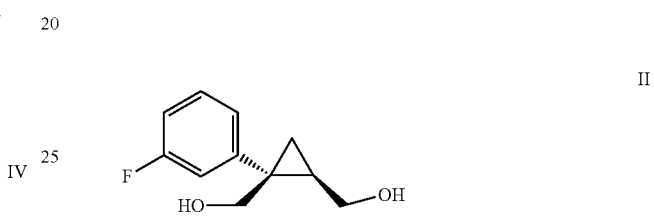

II comprising:
  adding methanol to a composition comprising a compound of Formula I:

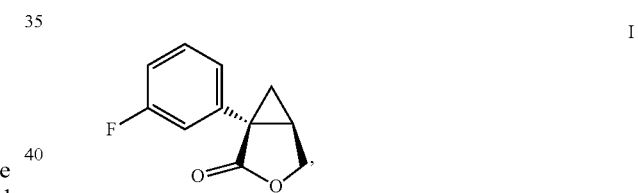

I toluene, tetrahydrofuran and sodium borohydride.

In the above-described method, a reaction solvent may be a liquid mixture of toluene, tetrahydrofuran and methanol, and a reaction temperature may be 50° C. or lower.

There is provided a compound of Formula XI, wherein a content of a compound of Formula XII is 0.10 mass % or less.

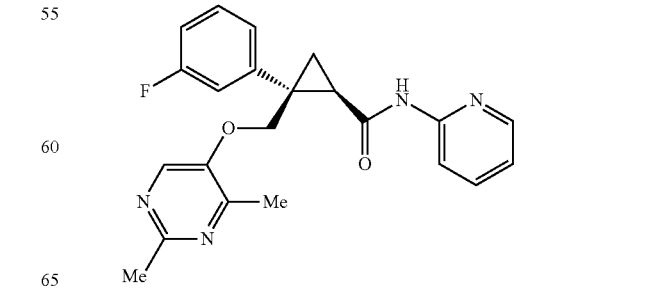

XII

XI

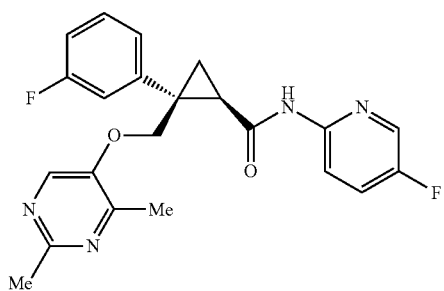

There is provided the compound of Formula XI described above, wherein the content of the compound of Formula XII is determined by high performance liquid chromatography (HPLC).

There is provided a compound of Formula XI, wherein a content of all related substances including compounds of Formula VI, Formula IX, Formula X, Formula XIII, Formula XIV and Formula XV is 1.0 mass % or less.

VI

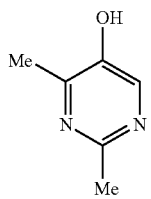

IX

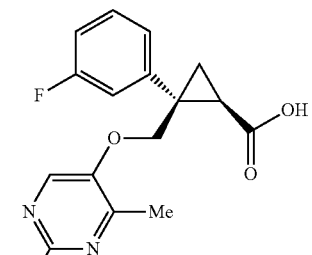

X

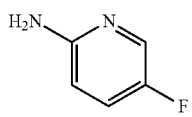

XIII

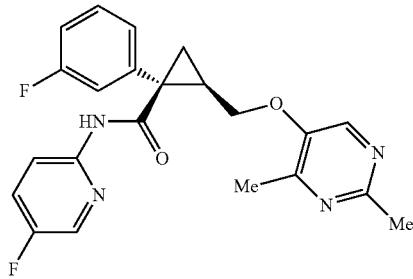

XIV

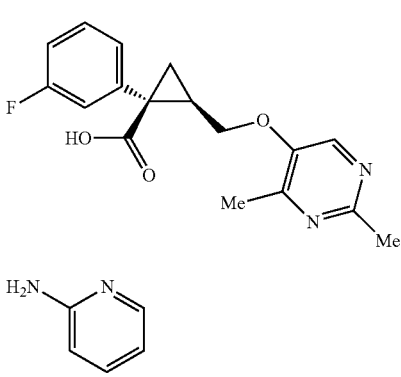

XV

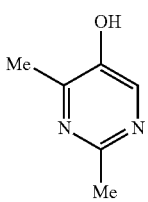

XI

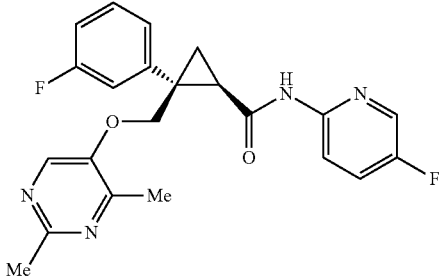

There is provided the compound of Formula XI described above, wherein the content of all related substances including the compounds of Formula VI, Formula IX, Formula X, Formula XIII, Formula XIV and Formula XV is determined by high performance liquid chromatography (HPLC).

There is provided a compound of Formula XI, wherein a content of a compound of Formula XII is 0.10 mass % or less, and a content of all related substances including compounds of Formula VI, Formula IX, Formula X, Formula XIII, Formula XIV and Formula XV is 1.0 mass % or less.

VI

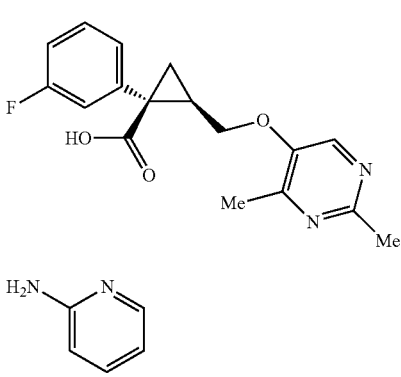

IX

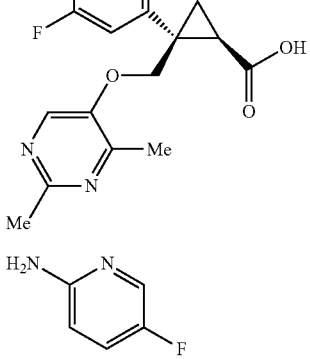

X

XIII

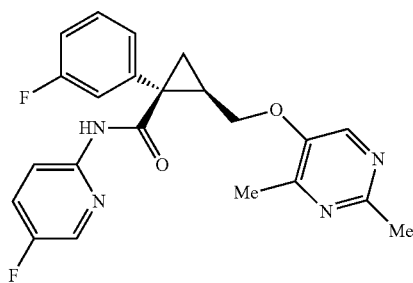

XIV

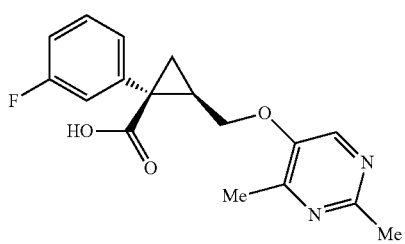

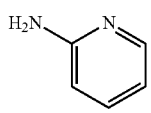

XII

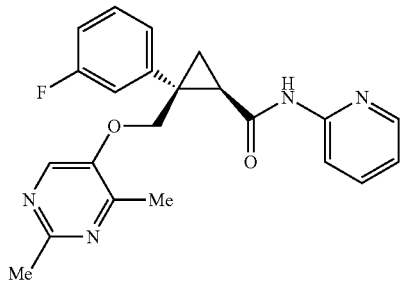

XI

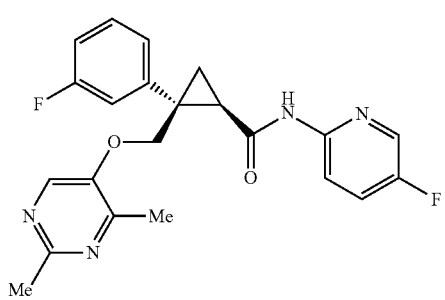

VI

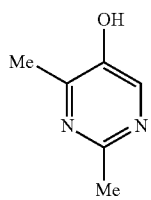

XI

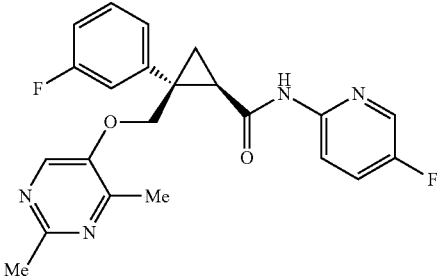

There is provided the compound of Formula XI described above, wherein the content of the compound of Formula VI is determined by high performance liquid chromatography (HPLC).

There is provided a compound of Formula XI, wherein a content of a compound of Formula IX is 0.05 mass % or less.

IX

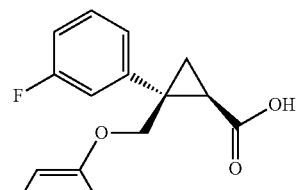

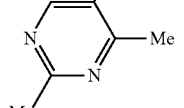

XI

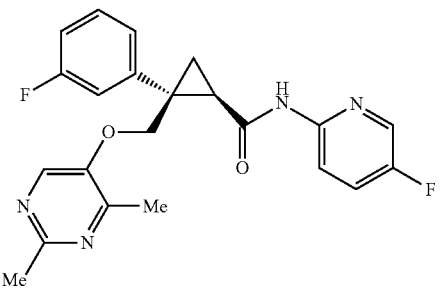

There is provided the compound of Formula XI described above, wherein the contents of the compound of Formula XII and all related substances including the compounds of Formula VI, Formula IX, Formula X, Formula XIII, Formula XIV and Formula XV are determined by high performance liquid chromatography (HPLC).

There is provided a compound of Formula XI, wherein a content of a compound of Formula VI is 0.05 mass % or less.

There is provided the compound of Formula XI described above, wherein the content of the compound of Formula IX is determined by high performance liquid chromatography (HPLC).

There is provided a compound of Formula XI, wherein a content of a compound of Formula X is 0.05 mass % or less.

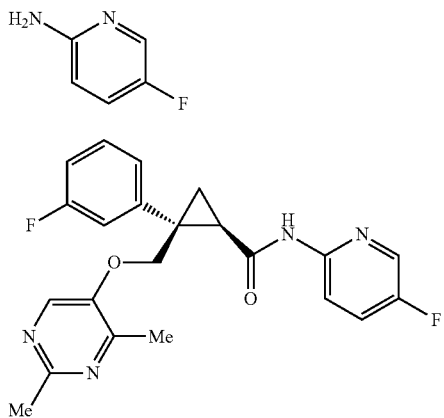

X

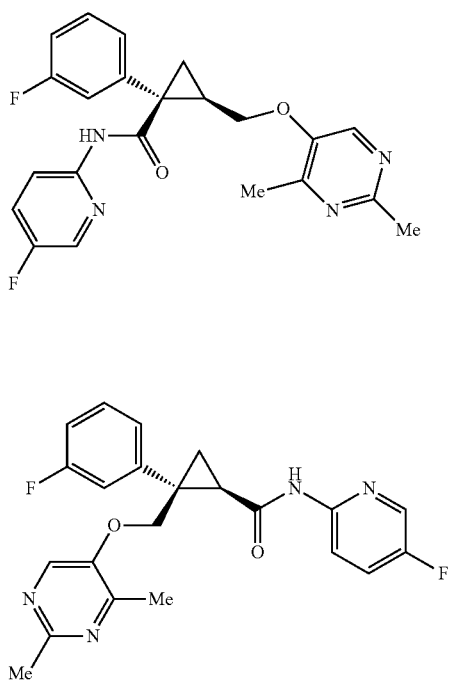

XI

There is provided the compound of Formula XI described above, wherein the content of the compound of Formula X is determined by high performance liquid chromatography (HPLC).

There is provided a compound of Formula XI, wherein a content of a compound of Formula XIII is 0.05 mass % or less.

XIII

XI

There is provided the compound of Formula XI described above, wherein the content of the compound of Formula XIII is determined by high performance liquid chromatography (HPLC).

There is provided a compound of Formula XI, wherein a content of a compound of Formula XIV is 0.05 mass % or less.

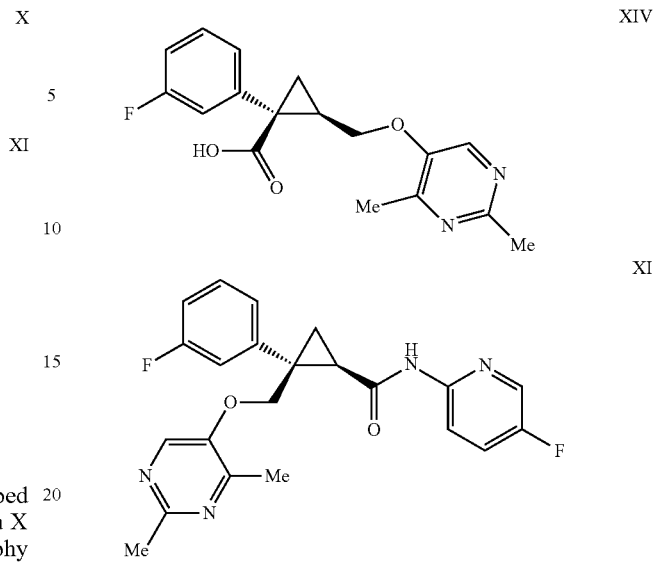

XIV

XI

There is provided the compound of Formula XI described above, wherein the content of the compound represented by Formula XIV is determined by high performance liquid chromatography (HPLC).

There is provided a compound of Formula XI, wherein a content of a compound of Formula XV is 0.05 mass % or less.

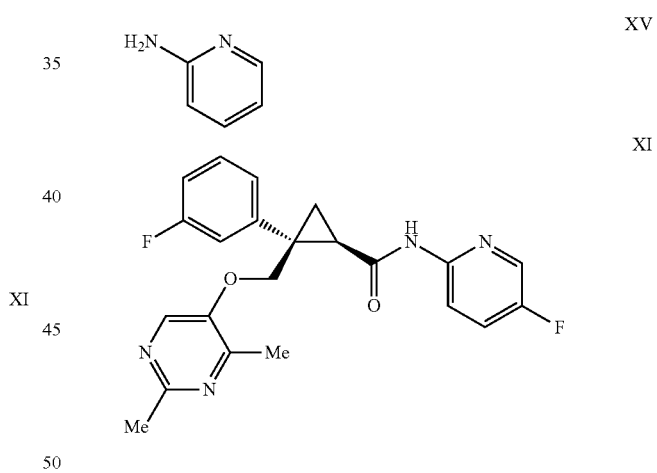

XV

XI

There is provided the compound of Formula XI described above, wherein the content of the compound of Formula XV is determined by high performance liquid chromatography (HPLC).

Any of the compounds that are exemplified above and used in the methods disclosed in the present specification can be provided in a stereochemically pure form, and these are supposed to be understood to be included in the present disclosure. In one embodiment, a stereochemically pure compound has approximately more than 75 weight % of one stereoisomer of the compound and approximately less than 25 weight % of another stereoisomer, approximately more than 80 weight % of one stereoisomer of the compound and approximately less than 20 weight % of another stereoisomer, approximately more than 85 weight % of one stereoisomer of the compound and approximately less than 15 weight % of another stereoisomer, approximately more than 90 weight % of one stereoisomer of the compound and approximately less than 10 weight % of another stereoisomer, approximately more than 95 weight % of one stereoisomer of the compound and approximately less than 5 weight % of another stereoisomer, approximately more than 97 weight % of one stereoisomer of the compound and approximately less than 3 weight % of another stereoisomer or approximately more than 98 weight % of one stereoisomer of the compound and approximately less than 2 weight % of another stereoisomer. In one embodiment, the stereochemically pure compound has approximately more than 99 weight % of one stereoisomer of the compound and approximately less than 1 weight % of another stereoisomer.

As described above, in one embodiment, a compound that is described in the present specification can be provided as a salt, for example, a pharmaceutically acceptable salt.

A certain embodiment makes it possible to produce the compound of Formula XI wherein the content of the compound of Formula XII is 0.10 mass % or less, the content of each of the compounds of Formula VI, Formula IX, Formula X, Formula XIII, Formula XIV and Formula XV is 0.05 mass % or less, and the content of all related substances including the compounds of Formula VI, Formula IX, Formula X, Formula XIII, Formula XIV and Formula XV is 1.0 mass % or less.

A certain embodiment makes it possible to produce the compound of Formula XI wherein the content of the compound of Formula XI is 97.0 mass % or more, 98.0 mass % or more or 98.5 mass % or more and 102.0 mass % or less, 100.0 mass % or less, 99.9 mass % or less, 99.0 mass % or less or 98.9 mass % or less. Here, the content of the compound of Formula XI is determined by high performance liquid chromatography (HPLC). More specifically, HPLC is performed under conditions described in the section of "Purity test" of the following examples, and the content is shown by a numerical value obtained by dividing the peak area of the compound of Formula XI, which is a specimen, by the peak area of a standard product of the compound of Formula XI on a chromatogram.

Another embodiment of the present invention is a pharmaceutical composition containing the compound of Formula XI or crystals thereof and a pharmaceutically acceptable additive. The pharmaceutical composition can be produced by mixing the pharmaceutically acceptable additive with the compound of Formula XI or the crystals thereof. The pharmaceutical composition according to the present invention can be produced according to a known method, for example, the method described in the general rules for preparation of Japanese Pharmacopoeia 17th Edition.

EXAMPLES

Hereinafter, the present invention will be described in detail using examples. However, the present invention is not limited to these examples. In addition, abbreviations that are used in the following examples are common abbreviations well known to those skilled in the art, and several abbreviations are as described below.

Chemical shifts in a proton nuclear magnetic resonance ($^1$H-NMR) spectrum are recorded in δ units (ppm) with respect to tetramethylsilane, and coupling constants are recorded in Hertz (Hz). In patterns, s, d, br and in means singlet, doublet, broad and multiplet, respectively.

$^1$H-NMR) spectra and $^{13}$C-NMR spectra were measured using Varian 400, a 500 MHz spectrometer or JNM-AL400 type nuclear magnetic resonance spectrometer (400 MHz) manufactured by JEOL Ltd.

"Room temperature" in the following examples generally indicates approximately 10° C. to approximately 35° C. Unless particularly otherwise described, "%" indicates weight percentages.

(A) Production of (1S,5R)-1-(3-fluorophenyl)-3-oxabicyclo[3.1.0]hexan-2-one (Compound of Formula I)

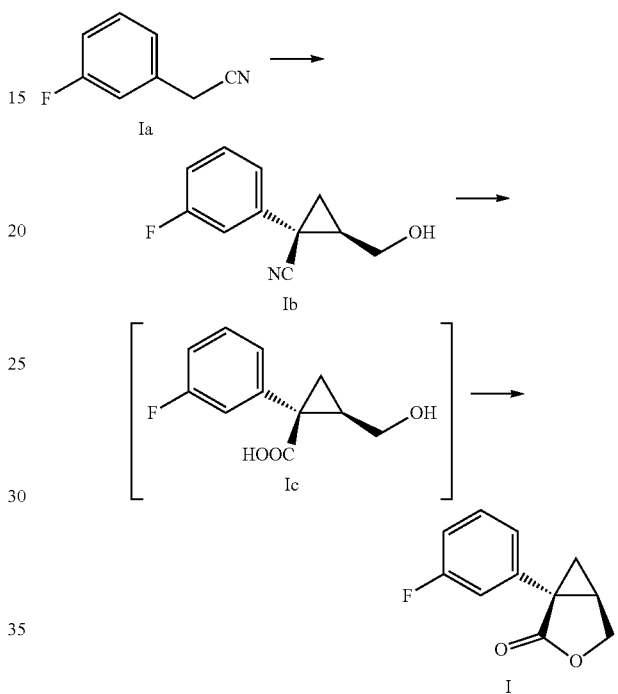

(A-1) Synthesis of (1S,2R)-1-(3-fluorophenyl)-2-(hydroxymethyl)cyclopropan-1-carbonitrile (Compound of Formula Ib)

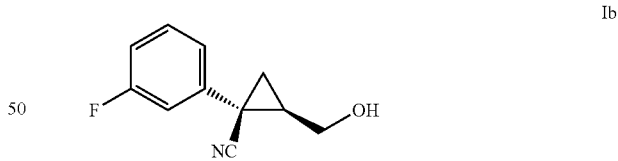

A solution obtained by mixing (3-fluorophenyl)acetonitrile (120 kg, 888 mol, 1.0 equiv.) and tetrahydrofuran (9.0 kg) was added dropwise at −10° C. to 0° C. to a solution obtained by mixing sodium tert-butoxide (188 kg, 1954 mol, 2.2 equiv.) and tetrahydrofuran (890 kg). After the solution was stirred for one hour or longer, (2R)-2-(chloromethyl) oxirane (94.5 kg, 1021 mol, 1.15 equiv.) was added dropwise thereto at −12° C. to 18° C. After the end of a reaction was confirmed by high performance liquid chromatography (hereinafter, referred to as "HPLC") analysis, water (50 kg) was added thereto and stirred. The solvent was distilled away under reduced pressure, and a (1S,2R)-1-(3-fluorophenyl)-2-(hydroxymethyl)cyclopropan-1-carbonitrile solution was obtained and used as it was in the next step.

Conditions for HPLC for Confirming the Above-Described Reaction:
Reagents And Mobile Phases:
Purified Water
  Acetonitrile (Kanto Chemical Co., Inc., Catalog No. 01031-2B, for high performance liquid chromatograph or equivalent product)
  Perchloric acid (70%) (Wako Pure Chemical Industries, Ltd., Catalog No. 162-00695, special grade chemical or equivalent product)
  Mobile phase A liquid: Liquid mixture of water, acetonitrile and perchloric acid (70%) (950:50:1, v/v/v)
  Mobile phase B liquid: Liquid mixture of water, acetonitrile and perchloric acid (70%) (100:900:1, v/v/v)
  Solution: Liquid mixture of water and acetonitrile (50:50, v/v)
  Rinse agent for needle in HPLC device: Liquid mixture of water and acetonitrile (50:50, v/v)
  Standard sample of (3-fluorophenyl)acetonitrile
HPLC Conditions:
  Detector: Shimadzu SPD-20A ultraviolet absorptiometer (measurement wavelength: 262 nm) or equivalent product
  Column: Stainless steel pipe having an inner diameter of 4.6 mm and a length of 15 cm and filled with 2.7 μm octadecyl-silylated silica gel for liquid chromatography Example: Meteoric Core C18 (YMC), (Equivalent to USP Packing Type L1)

Column temperature: Constant temperature near 30° C.
Mobile Phases:
  A liquid: Liquid mixture of water, acetonitrile and perchloric acid (70%) (950:50:1, v/v/v)
  B liquid: Liquid mixture of water, acetonitrile and perchloric acid (70%) (100:900:1, v/v/v)
  Flow rate: 0.9 mL/min
Gradient Conditions:

| Time (minutes) | Percentage of mobile phase B liquid (%) |
|---|---|
| 0 | 20 |
| 30 | 20 > Linear gradient |
| 40 | 100 |
| 45 | 100 |
| 45.01 | 20 |
| 55 | 20 |

Injection amount: 10 μL
Sample rack temperature: Constant temperature near 5° C.
Area measurement range: 30 Minutes (A-2) Synthesis of (1S,5R)-1-(3-fluorophenyl)-3-oxabicyclo[3.1.0]hexan-2-one (Compound of Formula I)

I

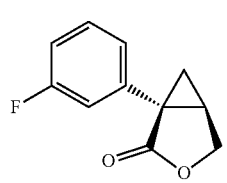

(A-2-1) Production of Seed Crystals

Sodium bis(trimethylsilyl)amide (tetrahydrofuran solution) (150 mL, 0.30 mol, 2.00 equiv.) was added dropwise at 0° C. to 7° C. to a solution obtained by mixing (3-fluorophenyl)acetonitrile (20 g, 0.15 mol, 1.00 equiv.) and tetrahydrofuran (150 mL). After the mixture was stirred for 0.5 hours, (2R)-2-(chloromethyl)oxirane (11.8 mL, 0.15 mol, 1.00 equiv.) was added dropwise thereto at 17° C. The mixture was stirred at 5° C. for two hours and stirred at room temperature for three days, water (10 mL) was then added thereto, and the mixture was stirred. The solvent was distilled away under reduced pressure, and (1S,2R)-1-(3-fluorophenyl)-2-(hydroxymethyl)cyclopropan-1-carbonitrile was obtained and used as it was in the next step.

Ethanol (150 mL) and a 2M potassium hydroxide aqueous solution (148 mL, 0.30 mol, 2.00 equiv.) were added to the obtained (1S,2R)-1-(3-fluorophenyl)-2-(hydroxymethyl)cyclopropan-1-carbonitrile, the mixture was stirred at 80° C. for four hours, and then water (66 mL) and concentrated hydrochloric acid (47.5 mL, 0.57 mol, 3.80 equiv.) were added thereto. The mixture was stirred at 60° C. for one hour and further stirred at room temperature for 45 hours. A precipitated solid was filtered, washed with water until the pH was confirmed to reach five and dried under a nitrogen stream, thereby obtaining (1S,5R)-1-(3-fluorophenyl)-3-oxabicyclo[3.1.0]hexan-2-one (23 g) in an yield of 81% (total yield from (3-fluorophenyl)acetonitrile).

(A-2-2) Synthesis of (1S,5R)-1-(3-fluorophenyl)-3-oxabicyclo[3.1.0]hexan-2-one (Compound of Formula I)

A-2-2-Step 1

Ethanol (237 kg), water (237 kg) and a 25% sodium hydroxide aqueous solution (220 kg, 1376 mol, 1.55 equiv.) were added to the (1S,2R)-1-(3-fluorophenyl)-2-(hydroxymethyl)cyclopropan-1-carbonitrile solution, and the mixture was stirred at an internal temperature of 77° C. to 87° C. After the end of a reaction was confirmed by HPLC analysis, the solvent was distilled away under reduced pressure, toluene (624 kg) and water (60 kg) were added thereto, stirred and then left to stand. After an organic layer was discharged, toluene (624 kg) was added to a water layer, stirred and then left to stand. The organic layer was discharged and used as it was in the next step.
Conditions for HPLC for Confirming the Above-Described Reaction:
Reagents and Mobile Phases:
  Purified water, acetonitrile, perchloric acid (70%), a mobile phase A liquid, a mobile phase B liquid, a solution and a rinse agent for a needle in an HPLC device were the same as in (A-1).
  Standard sample of (1S,2R)-1-(3-fluorophenyl)-2-(hydroxymethyl)cyclopropan-1-carbonitrile
HPLC Conditions:
  Same as in (A-1).
(A-2-2-Step 2)
Toluene (409 kg) and 35% hydrochloric acid (287 kg, 2753 mol, 3.10 equiv.) were added to the solution obtained in (A-2-2-step 1). The mixture was stirred at an internal temperature of 55° C. to 65° C., and the end of a reaction was confirmed by HPLC analysis. After the internal temperature was confirmed to reach 35° C., the mixture was left to stand, the water layer was discharged, then, toluene (172 kg) and a 7% sodium hydrogen carbonate aqueous solution (482 kg) were added to an organic layer, stirred and then left to stand. After the water layer was discharged, water (480 kg) was added to the organic layer, stirred and then left to stand. The water layer was discharged, and the content of (1S,5R)-1-(3-fluorophenyl)-3-oxabicyclo[3.1.0]hexan-2-one in the organic layer was calculated. The solvent was distilled away under reduced pressure, and ethanol (614 kg) was then added thereto. After the solvent was distilled away under reduced pressure, ethanol was added thereto such that the total volume reached an amount twice the content of (1S,5R)-1-(3-fluorophenyl)-3-oxabicyclo[3.1.0]hexan-2-one.

(1S,5R)-1-(3-Fluorophenyl)-3-oxabicyclo [3.1.0]hexan-2-one was heated and dissolved under stirring at an internal temperature of 60° C. to 65° C., and water was added thereto as much as 0.8 times the content of (1S,5R)-1-(3-fluorophenyl)-3-oxabicyclo[3.1.0]hexan-2-one. After cooling, 60 g of seed crystals were added thereto at an internal temperature of 40° C. to 50° C., and precipitation of crystals was confirmed. The mixture was stirred at an internal temperature of 40° C. to 50° C. for one hour or longer and cooled to −5° C. to 5° C. or lower at −10° C./H to −20° C./H, and a precipitated solid was filtered and washed with ethanol The obtained solid was dried at an external temperature of 45° C. or lower under reduced pressure, thereby obtaining (1S,5R)-1-(3-fluorophenyl)-3-oxabicyclo[3.1.0]hexan-2-one (103 kg) in an yield of 60% (total yield from (3-fluorophenyl) acetonitrile).

Conditions for HPLC for Confirming the Above-Described Reaction:

Reagents and Mobile Phases:

Purified water, acetonitrile, perchloric acid (70%), a mobile phase A liquid, a mobile phase B liquid, a solution and a rinse agent for a needle in an HPLC device were the same as in (A-1).

(1S,2R)-1-(3-Fluorophenyl)-2-(hydroxymethyl)cyclopropan-1-carboxylic acid solution (concentration of approximately 0.5 mg/mL)

HPLC Conditions:

A detector, a column, a column temperature, mobile phases, a flow rate, an injection amount and a sample rack temperature were the same as in (A-1). Gradient conditions:

| Time (minutes) | Percentage of mobile phase B liquid (%) |
|---|---|
| 0 | 15 |
| 15 | 15 > Linear gradient |
| 35 | 40 > Linear gradient |
| 40 | 100 |
| 45 | 100 |
| 45.01 | 15 |
| 55 | 15 |

Area measurement range: 40 Minutes

NMR Data (1S,5R)-1-(3-fluorophenyl)-3-oxabicyclo[3.1.0]hexan-2-one:

$^1$H NMR (500 MHz, DMSO-$d_6$) δ7.43-7.36 (m, 1H), 7.35-7.31 (m, 1H), 7.31-7.28 (m, 1H), 7.14-7.08 (m, 1H), 4.46 (dd, J=9.1, 4.6 Hz, 1H), 4.25 (d, J=9.1 Hz, 1H), 2.80 (dt, J=8.0, 4.6 Hz, 1H), 1.72 (dd, J=7.9, 4.8 Hz, 1H), 1.37 (t, J=4.8 Hz, 1H);

$^{13}$C NMR (126 MHz, DMSO-$d_6$) δ175.35, 161.98 (d, JCF=243.1 Hz), 137.67 (d, JCF=8.2 Hz), 130.15 (d, JCF=8.6 Hz), 124.19 (d, JCF=2.8 Hz), 115.01 (d, JCF=22.4 Hz), 113.95 (d, JCF=20.9 Hz), 67.93, 30.70 (d, JCF=2.4 Hz), 25.57, 19.99.

(B) Production of 2,4-dimethylpyrimidin-5-ol (Compound of Formula VI)

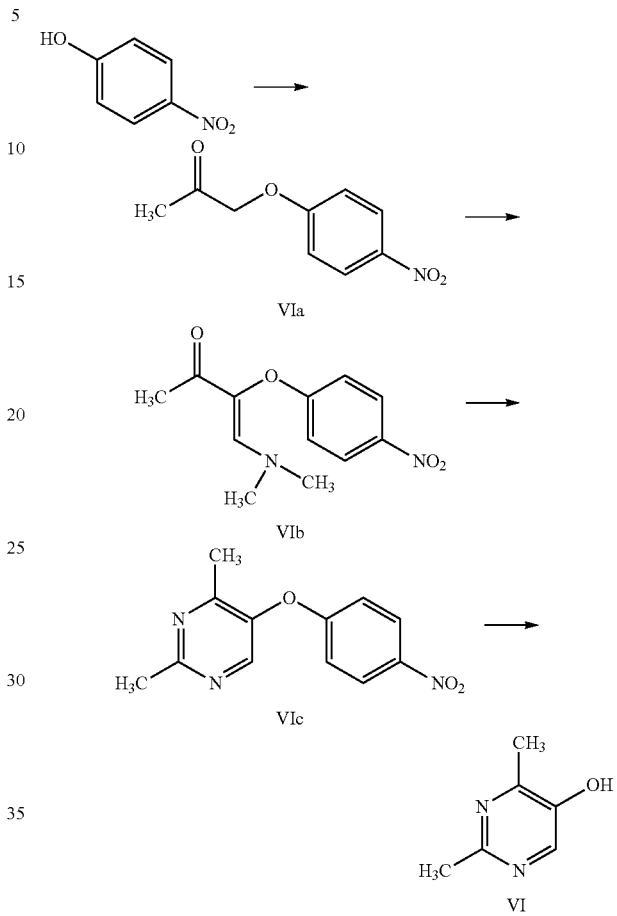

(B-1) Production of 1-(4-nitrophenoxy)propan-2-one (Compound of Formula VIa)

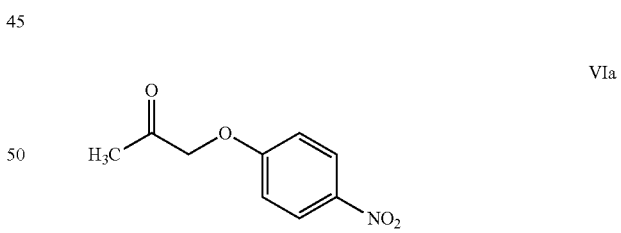

A mixture of 4-nitrophenol (305.0 kg, 2192.5 mmol), potassium carbonate (318.2 kg, 2302.1 mmol) and acetonitrile (1678 kg) was stirred at 60° C. for 30 minutes. Chloroacetone (net: 213.0 kg, 2302.1 mmol) was added dropwise to the reaction mixture at 60° C., and the obtained mixture was stirred at 60° C. (external temperature) for seven hours. The reaction mixture was cooled in an ice bath, and toluene (1847 kg) and water (1830 kg) were added to the reaction mixture at the same temperature. The obtained reaction mixture was stirred at room temperature, and then an organic layer was separated and washed with salt water (1525 kg of water and 170.8 kg of salt). The solvent was distilled away under reduced pressure, the obtained residue was dissolved in toluene (1319 kg) at 55° C. (internal temperature) and then cooled to an internal temperature of 5° C., and a precipitated solid was filtered. The obtained solid was washed with an appropriate amount of toluene, thereby obtaining a wet body (thy-equivalent yield of 343.9 kg, yield of 80%) of a title compound.

$^1$H-NMR (CD$_3$Cl) δ (ppm): 2.31 (3H, s), 4.67 (2H, s), 6.95 (2H, d, J=9.3 Hz), 8.22 (2H, d, J=9.3 Hz).

(B-2) Production of (Z)-4-(dimethylamino)-3-(4-nitrophenoxy)but-3-en-2-one (Compound of Formula VIb)

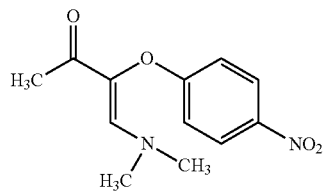

Toluene (1785 kg) was added to 1-(4-nitrophenoxy)propan-2-one (dry equivalent: 343.9 kg, 1762.1 mmol) and partially concentrated, and then N,N-dimethylformamide dimethyl acetal (231.0 kg, 1938.3 mmol) was added thereto and stirred at 78° C. (internal temperature) for 20 hours. Toluene (595 kg) was added to the reaction mixture at the same temperature, and methanol (163 kg) was added thereto at an internal temperature of 55° C., aged for 30 minutes and then cooled to 5° C. A precipitated solid was filtered. The obtained solid was washed with an appropriate amount of toluene, thereby obtaining a wet body (dry-equivalent yield of 159.0 kg, yield of 36%) of a title compound.

$^1$H-NMR (CD$_3$Cl) δ (ppm): 2.00 (3H, brs), 3.01(6H, s), 6.90-7.16 (2H, brm), 7.16-7.46 (1H, brs), 8.22 (2H, d, J=8.8 Hz).

In addition, the compound of Formula VIb can also be produced by a method as described below.

(B-2-a) Production of (Z)-4-(dimethylamino)-3-(4-nitrophenoxy)but-3-en-2-one (Compound of Formula VIb)

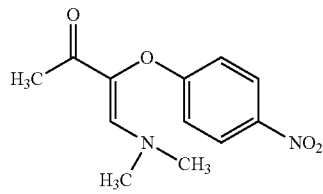

Acetonitrile (15 mL) was added to 1-(4-nitrophenoxy)propan-2-one (15.0 g, 76.9 mmol) and 4-nitrophenol (802 mg, 5.76 mmol), and N,N-dimethylformamide dimethyl acetal (15.4 mL, 115 mmol) was added thereto and stirred at 78° C. (external temperature) for 19 hours. Toluene (300 mL) was added to the reaction mixture at 50° C. (external temperature) and cooled to 5° C. (external temperature), and a precipitated solid was filtered. The obtained solid was washed with an appropriate amount of toluene and then dried at 50° C. under reduced pressure, thereby obtaining a title compound (12.4 g, yield of 64%).

(B-2-b) Production of (Z)-4-(dimethylamino)-3-(4-nitrophenoxy)but-3-en-2-one (Compound of Formula VIb)

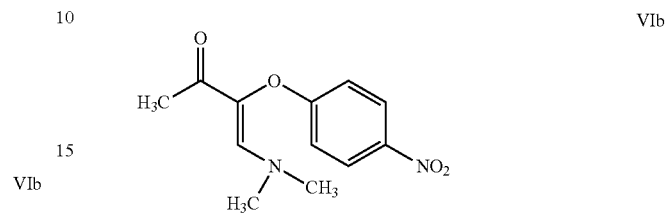

A mixture of 4-nitrophenol (50.0 g, 359 mmol), potassium carbonate (52.2 g, 377 mmol) and acetonitrile (350 mL) was stirred at 60° C. (external temperature) for one hour. Chloroacetone (31.5 mL, 377 mmol) was added dropwise to the reaction mixture at the same temperature, and the obtained mixture was stirred at the same temperature for 25 hours. The reaction mixture was stirred under ice chilled water, and toluene (350 mL) and water (300 mL) were added to the reaction mixture at 13° C. (internal temperature). The obtained reaction mixture was stirred at room temperature, and then an organic layer was separated and washed with salt water (250 mL of water and 27.8 g of salt). The solvent was distilled away from this organic layer (168.5 g) under reduced pressure, and acetonitrile (60 mL) was added to the obtained residue (1-(4-nitrophenoxy)propan-2-one (compound of Formula VIa); net: 16.7 g, 85.6 mmol) to distill away the solvent under reduced pressure. After acetonitrile (60 mL) was added to the obtained residue to distill away the solvent under reduced pressure, acetonitrile (16.7 mL) was added to and dissolved in the residue, and then N,N-dimethylformamide dimethyl acetal (17.2 mL, 128 mmol) was added thereto and stirred at 78° C. (external temperature) for 19.5 hours. Toluene (200 mL) was added to the reaction mixture at the same temperature and cooled to 6° C. (external temperature), and a precipitated solid was filtered. The obtained solid was washed with an appropriate amount of toluene and then dried at 50° C. under reduced pressure, thereby obtaining a title compound (12.3 g, yield of 58%).

(B-2-c) Production of (Z)-4-(dimethylamino)-3-(4-nitrophenoxy)but-3-en-2-one (Compound of Formula VIb)

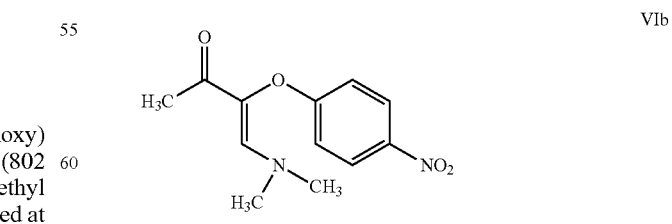

Triethylamine (5.3 mL, 38.2 mmol) and chloroacetone (3.0 mL, 36.4 mmol) were added to a mixture of 4-nitrophenol (5.57 g, 40.1 mmol) and acetonitrile (17 mL) at 18° C. (internal temperature) and stirred at 55° C. (external temperature) for 69 hours. N,N-dimethylformamide dimethyl acetal (7.3 mL, 54.6 mmol) was added to the reaction mixture at 30° C. (external temperature) and stirred at 80° C. (external temperature) for 43 hours. N,N-dimethylformamide dimethyl acetal (7.3 mL, 54.6 mmol) was added to the reaction mixture at 36° C. (internal temperature) and stirred at 80° C. (external temperature) for 18.5 hours. The internal temperature was cooled to 45° C. or lower, toluene (40 mL) was then added thereto, and the solvent was distilled away under reduced pressure. Toluene (111 mL) and acetonitrile (5.6 mL) were added to the obtained residue and stirred at 80° C. (external temperature), methanol (4.4 mL) was added thereto and then cooled to 6° C. (external temperature), and a precipitated solid was filtered. The obtained solid was washed with an appropriate amount of toluene and then dried at 50° C. under reduced pressure, thereby obtaining a title compound (3.97 g, yield of 44%).

(B-2-d) Production of (Z)-4-(dimethylamino)-3-(4-nitrophenoxy)but-3-en-2-one (Compound of Formula VIb)

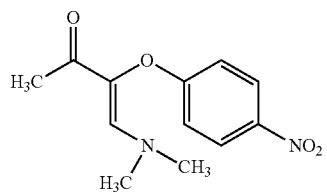

VIb

A mixture of 4-nitrophenol (50.0 g, 359 mmol), potassium carbonate (49.6 g, 359 mmol) and acetonitrile (350 mL) was stirred at room temperature for 25 minutes. Chloroacetone (33.3 g, 359 mmol) was added dropwise to the mixture at the same temperature, and the mixture was stirred at 60° C. (external temperature) for 14 hours. Toluene (350 mL) and water (300 mL) were added to the obtained reaction mixture (a mixture of 1-(4-nitrophenoxy)propan-2-one (compound of Formula VIa) and 4-nitrophenol (97:3)) and stirred. An organic layer was separated and washed with water (250 mL). The solvent in the organic layer was distilled away under reduced pressure, toluene (500 mL) was added to the obtained residue (284 g), and the solvent was distilled away under reduced pressure. Toluene (103 g) and N,N-dimethylformamide dimethyl acetal (52.9 mL, 395 mmol) were added to the obtained residue (149 g) and stirred at 80° C. (external temperature) for 15 hours. The obtained reaction mixture was cooled to room temperature, aged for three hours, then, cooled to 5° C. (external temperature) and aged for two hours. The precipitated solid was filtered and washed with an appropriate amount of toluene. The solid was dried at 50° C. under reduced pressure, thereby obtaining a title compound (55.7 g, yield of 62%).

(B-3) Production of 2-4-dimethyl-5-(4-nitrophenoxy)pyrimidine (Compound of Formula VIc)

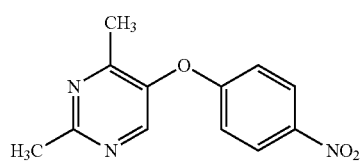

VIc

A sodium ethoxide 20% ethanol solution (518.8 kg, 1524.9 mol), ethanol (213 kg) and acetamidinium chloride (net: 144.2 kg, 1524.9 mmol) were added and stirred at 25° C. (internal temperature) for 94 minutes. (Z)-4-(dimethylamino)-3-(4-nitrophenoxy)but-3-en-2-one (dry equivalent: 159.0 kg, 635 4 mmol) was fed, and a mixture was stirred at 60° C. (internal temperature) for five hours. The reaction mixture was cooled to 5° C. (internal temperature), then, water (2385 kg) was added thereto, and a precipitated solid was filtered. The obtained solid was washed with an appropriate amount of water, thereby obtaining a wet body (dry-equivalent yield of 146.1 kg, yield of 94%) of a title compound.

$^1$H-NMR (CD$_3$Cl) δ (ppm): 2.40 (3H, s), 2.75 (3H, s), 6.96 (2H, d, J=9.0 Hz), 8.24 (2H, d, J=9.0 Hz), 8.32 (1H, s).

(B-4) Production of 2,4-dimethylpyrimidin-5-ol (Compound of Formula VI)

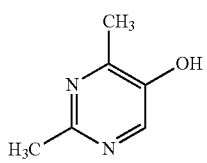

VI

A mixture of 2-4-dimethyl-5-(4-nitrophenoxy)pyrimidine (dry equivalent: 146.1 kg, 595.8 mmol), methanol (579 kg) and a sodium hydroxide aqueous solution (71.5 kg of sodium hydroxide and 77.5 kg of water, 1787.3 mmol) was stirred at 60° C. (internal temperature) for 13 hours. Toluene (1264 kg) and water (584 kg) were added to the reaction mixture, stirred and left to stand, and then a water layer was separated and concentrated under reduced pressure. The obtained concentrated liquid was cooled to 8° C. (internal temperature), toluene (316 kg) was then added thereto, and concentrated hydrochloric acid (310.3 kg, 2978.8 mmol) was added thereto at an internal temperature of 0° C. to 15° C. Ethyl acetate (328 kg) was added thereto to separate a liquid. A water layer was separated and washed with toluene-ethyl acetate (316 kg-328 kg). Ethyl acetate (1311 kg) was added to the obtained water layer, the water layer was cooled to 5° C. (internal temperature), and a 5 mol/l sodium hydroxide aqueous solution was added thereto such that the pH of the reaction mixture reached 6.5. An organic layer was separated, and the water layer was extracted again with ethyl acetate (1311 kg). The obtained organic layer was combined and then washed with water (44 kg), and the solvent was distilled away under reduced pressure. Toluene (379 kg) was added to the obtained residue to suspend and stir the residue at 50° C. (internal temperature) for two hours. The mixture was cooled to 10° C. (internal temperature), stirred for two hours and then filtered. The obtained solid was washed with an appropriate amount of toluene and then dried at 45° C. under reduced pressure, thereby obtaining a title compound (63.7 kg, 86%).

$^1$H-NMR (CD$_3$Cl) δ (ppm): 2.51 (3H, s), 2.65 (3H, s), 8.02 (1H, s), 10.01 (1H, brs).

(C) Production of (1R,2S)-2-{[(2,4-dimethylpyrimidin-5-yl)oxy]methyl}-2-(3-fluorophenyl)cyclopropane carboxylic acid (Compound of Formula IX)

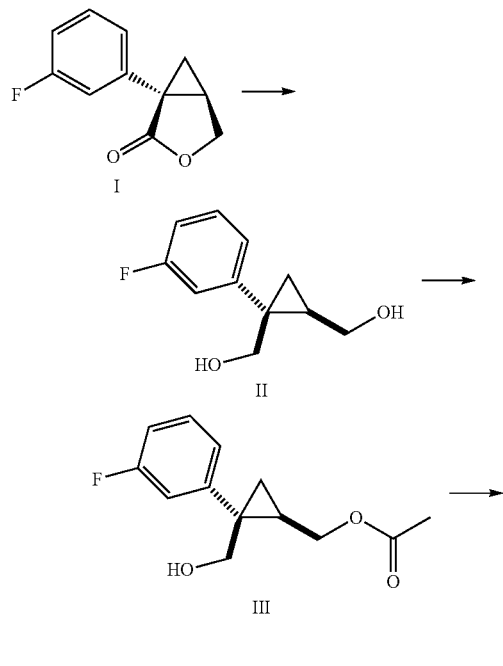

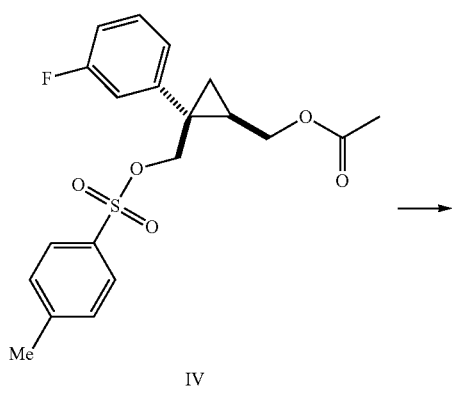

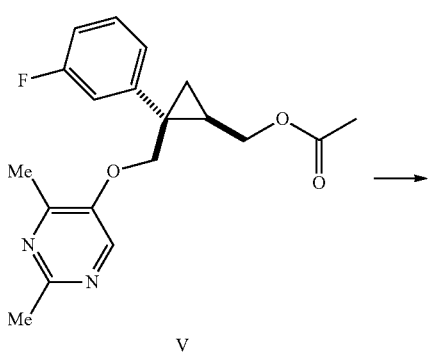

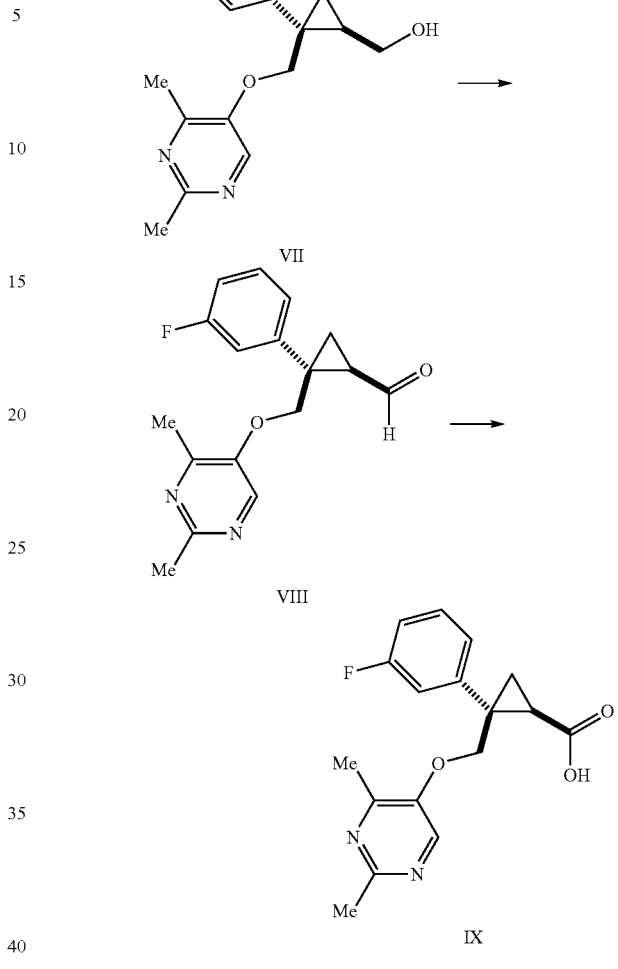

(C-1) Production of [(1S,2R)-1-(3-fluorophenyl)cyclopropan-1,2-diyl]dimethanol (Compound of Formula II)

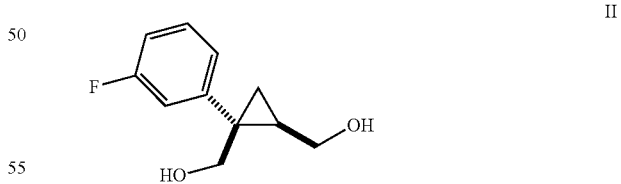

Methanol (58.3 kg, 1821 mol, 5.00 equiv.) was added to a mixture of (1S,5R)-1-(3-fluorophenyl)-3-oxabicyclo[3.1.0]hexan-2-one (70 kg, 364 mol, 1.00 equiv.), toluene (350 L), tetrahydrofuran (350 L) and sodium borohydride (13.8 kg, 364 mol, 1.00 equiv.) and stirred at 50° C. or lower. After the end of a reaction was confirmed by HPLC analysis, the reaction liquid and toluene (140 L) were added to a 20% citric acid aqueous solution (350 kg), stirred and then left to stand. After a water layer was discharged, a 5% hydrogen sodium carbonate aqueous solution (140 kg) was added to an organic layer, stirred and then left to stand. The water layer was discharged, a 5% sodium chloride aqueous solution (140 kg) was added to the organic layer, stirred and then left to stand. The water layer was discharged, the solvent was distilled away under reduced pressure, and a [(1S,2R)-1-(3-fluorophenyl)cyclopropan-1,2-diyl]dimethanol (equivalent to 67.2 kg, yield of 94%) toluene solution was obtained and used as it was in the next step.

Conditions for HPLC for Confirming the Above-Described Reaction:
Reagents and Mobile Phases:
Purified Water
Acetonitrile (Kanto Chemical Co., Inc., Catalog No. 01031-2B, for high performance liquid chromatograph or equivalent product)
Trifluoroacetic acid (Wako Pure Chemical Industries, Ltd., Catalog No. 208-02741, special grade chemical or equivalent product)
Mobile phase A liquid: Liquid mixture of water and trifluoroacetic acid (1000/1, v/v)
Mobile phase B liquid: Liquid mixture of acetonitrile and trifluoroacetic acid (1000/1, v/v)
Solution: Liquid mixture of water, acetonitrile and trifluoroacetic acid (500/500/1, v/v/v)
Rinse agent for needle in HPLC device: Liquid mixture of water and acetonitrile (100/900, v/v)
Standard sample of (1S,5R)-1-(3-fluorophenyl)-3-oxabicyclo[3.1.0]hexan-2-one
HPLC Conditions:
Detector: Shimadzu SPD-20A ultraviolet absorptiometer (measurement wavelength: 220 nm) or equivalent product
Column: Stainless steel pipe having an inner diameter of 4.6 mm and a length of 15 cm and filled with 3.5 μm octadecyl-silylated silica gel for liquid chromatograph Example: SunFire C18 (Waters) (Equivalent to USP Packing L1)

Column temperature: Constant temperature near 40° C.
Mobile Phases:
A liquid: Liquid mixture of water and trifluoroacetic acid (1000/1, v/v)
B liquid: Liquid mixture of acetonitrile and trifluoroacetic acid (1000/1, v/v)
Flow rate: Constant flow rate of approximately 10 mL/min
Gradient Conditions:

| Time (minutes) | Percentage of mobile phase B liquid (%) |
|---|---|
| 0 | 5 > Linear gradient |
| 7 | 30 |
| 20 | 30 > Linear gradient |
| 34 | 100 |
| 39 | 100 |
| 39.01 | 5 |
| 50 | Stop |

Injection amount: 5 μL
Sample rack temperature: Constant temperature near 10° C.
Needle rinse agent: Liquid mixture of water and acetonitrile (10/90, v/v)
Area measurement target range: Up to 34 minutes (C-2) Production of [(1R,2S)-2-(3-fluorophenyl)-2-(hydroxymethyl)cyclopropyl]methyl=acetate (Compound of Formula III)

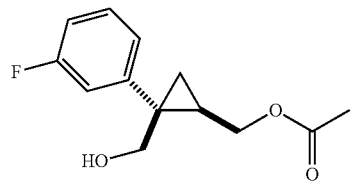

III

Cyclohexyl magnesium chloride (1 mol/kg tetrahydrofuran solution) (349 kg, 349 mol, 1.02 equiv.) was added to a mixture of a [(1S,2R)-1-(3-fluorophenyl)cyclopropan-1,2-diyl]dimethanol toluene solution (equivalent to 67.2 kg of [(1S,2R)-1-(3-fluorophenyl)cyclopropan-1,2-diyl]dimethanol, 342 mol, 1.00 equiv.) and tetrahydrofuran (269 L) and stirred at 60° C. or lower. The obtained solution was added to a mixture of ethyl acetate (336 L) and acetyl chloride (29.6 kg, 377 mol, 1.10 equiv.) and stirred at 20° C. or lower. The end of a reaction was confirmed by HPLC analysis, water (202 L) was added thereto, stirred and then left to stand. After a water layer was discharged, a 6% hydrogen sodium carbonate aqueous solution (215 kg) was added to an organic layer, stirred and then left to stand. After the water layer was discharged, a 4% sodium chloride aqueous solution (175 kg) was added to the organic layer, stirred and then left to stand. The water layer was discharged, the solvent was distilled away under reduced pressure, and toluene (134 L) was added thereto. The solvent was distilled away under reduced pressure, and a [(1R,2S)-2-(3-fluorophenyl)-2-(hydroxymethyl)cyclopropyl]methyl=acetate toluene solution was obtained and used as it was in the next step.

Conditions for HPLC for Confirming the Reaction:
Reagents and Mobile Phases:
Purified water, acetonitrile, trifluoroacetic acid, a mobile phase A liquid, a mobile phase B liquid, and a rinse agent for a needle in an HPLC device were the same as in (C-1).
Solution: Water/acetonitrile (500:500, v/v)
[(1S,2R)-1-(3-fluorophenyl)cyclopropan-1,2-diyl]dimethanol solution (concentration of approximately 0.5 mg/mL)
HPLC Conditions
A detector, a column, a column temperature, mobile phases, a flow rate, an injection amount and a sample rack temperature were the same as in (C-1).
Gradient Conditions:

| Time (minutes) | Percentage of mobile phase B liquid (%) |
|---|---|
| 0 | 5 > Linear gradient |
| 7 | 30 |
| 30 | 30 > Linear gradient |
| 44 | 100 |
| 49 | 100 |
| 49.01 | 5 |
| 60 | Stop |

Area measurement target range: Up to 44 minutes (C-3) Production of [(1R,2S)-2-(3-fluorophenyl)-2-({[4-methylphenyl)sulfonyl]oxy}methyl)cyclopropyl]methyl=acetate (Compound of Formula IV)

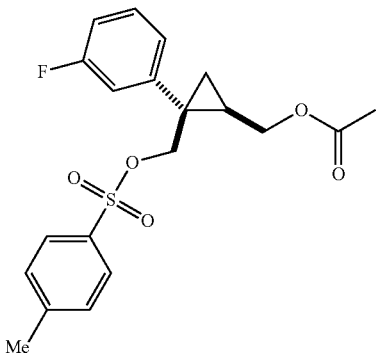

IV

Toluene (34 L) of p-toluenesulfonyl chloride (71.8 kg, 377 mol, 1.10 equiv.) and an acetonitrile (69 L) solution were added to a mixture of a [(1R,2S)-2-(3-fluorophenyl)-2-(hydroxymethyl)cyclopropyl]methyl=acetate toluene solution (equivalent to 81.6 kg of [(1R,2S)-2-(3-fluorophenyl)-2-(hydroxymethyl)cyclopropyl]methyl=acetate, 342 mol, 1.00 equiv.), toluene (294 L) (including the amount of toluene in the toluene solution), triethylamine (69.3 kg, 685 mol, 2.00 equiv.) and 1-methylimidazole (1.41 kg, 17 mol, 0.05 equiv.) at 30° C. or lower and then stirred at an external temperature of 8° C. After the end of a reaction was confirmed by HPLC analysis, acetonitrile (34 L) was added thereto and stirred. Triethylamine hydrochloride was removed by filtration, a filtered substance was washed with a liquid mixture of toluene (51 L) and acetonitrile (51 L) and mixed, whereby a [(1R,2S)-2-(3-fluorophenyl)-2-({[(4-methylphenyl)sulfonyl]oxy}methyl)cyclopropyl]methyl=acetate solution was obtained and used as it was in the next step.

Conditions for HPLC for Confirming the Above-Described Reaction:
Reagents and Mobile Phases:
Purified water, acetonitrile, trifluoroacetic acid, a mobile phase A liquid, a mobile phase B liquid, and a rinse agent for a needle in an HPLC device were the same as in (C-1).
Solution: Acetonitrile
[(1R,2S)-2-(3-fluorophenyl)-2-(hydroxymethyl)cyclopropyl]methyl=acetate toluene solution (final product of the prior step)
HPLC Conditions
Same as in (C-1).

(C-4) Production of [(1R,2S)-2-{[(2,4-dimethylpyrimidin-5-yl)oxy]methyl}-2-(3-fluorophenyl)cyclopropyl]methyl=acetate (Compound of Formula V)

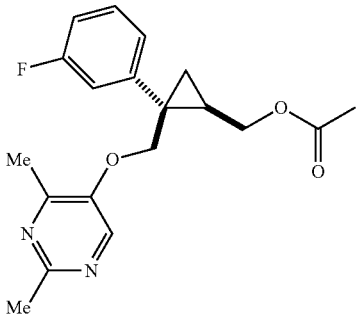

V

Potassium tert-butoxide (46.1 kg, 411 mol, 1.20 equiv.) was added to a mixture of 2,4-dimethylpyrimidin-5-ol (51.0 kg, 411 mol, 1.20 equiv.), N-methylpyrrolidone (273 L) and acetonitrile (85 L) and stirred at an external temperature of 50° C. A [(1R,2S)-2-(3-fluorophenyl)-2-({[4-methylphenyl)sulfonyl]oxy}methyl)cyclopropyl]methyl=acetate solution was added to the obtained solution and stirred at an external temperature of 50° C. After the end of a reaction was confirmed by HPLC analysis, water (547 L) was added thereto, stirred and then left to stand at 30° C. or lower. After liquid separation, an organic layer was stored, and toluene (220 L) was added to a water layer, stirred and then left to stand. The water layer was discharged, and the organic layer was mixed, whereby a [(1R,2S)-2-{[(2,4-dimethylpyrimidin-5-yl)oxy]methyl}-2-(3-fluorophenyl)cyclopropyl]methyl=acetate solution was obtained and used as it was in the next step.

Conditions for HPLC for Confirming the Above-Described Reaction:
Reagents and Mobile Phases:
Purified water, acetonitrile, trifluoroacetic acid, a mobile phase A liquid, a mobile phase B liquid, and a rinse agent for a needle in an HPLC device were the same as in (C-1).
Solution: Acetonitrile
[(1R,2S)-2-(3-fluorophenyl)-2-({[(4-methylphenyl)sulfonyl]oxy}methyl)cyclopropyl]methyl=acetate solution (concentration of approximately 1 mg/mL)
HPLC Conditions
Same as in (C-1).

(C-5) Production of [(1R,2S)-2-{[(2,4-dimethylpyrimidin-5-yl)oxy]methyl}-2-(3-fluorophenyl)cyclopropyl]methanol (Compound of Formula VII)

VII

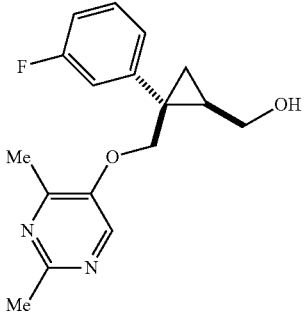

Water (734 L) and a 25% sodium hydroxide aqueous solution (107 L, 856 mol, 2.50 equiv.) were added to a [(1R,2S)-2-{[(2,4-dimethylpyrimidin-5-yl)oxy]methyl}-2-(3-fluorophenyl)cyclopropyl]methyl=acetate solution and stirred at an external temperature of 40° C. After the end of a reaction was confirmed by HPLC analysis, the reaction product was cooled and left to stand. After a water layer was discharged, a sodium dihydrogenphosphate aqueous solution (41.4 kg of sodium dihydrogenphosphate and 255 L of water) was added to an organic layer, stirred and then left to stand. After the water layer was discharged, water (204 L) was added to the organic layer, stirred and then left to stand. The water layer was discharged, toluene (86 L) was added thereto, and a [(1R,2S)-2-{[(2,4-dimethylpyrimidin-5-yl)oxy]methyl}-2-(3-fluorophenyl)cyclopropyl]methanol toluene solution was obtained and used as it was in the next step.

Conditions for HPLC for Confirming the Above-Described Reaction:

Reagents and Mobile Phases:

Purified water, acetonitrile, trifluoroacetic acid, a mobile phase A liquid, a mobile phase B liquid, and a rinse agent for a needle in an HPLC device were the same as in (C-1).

Solution: Liquid Mixture of Water and Acetonitrile (1/1, v/v)

[(1R,2S)-2-{[(2,4-dimethylpyrimidin-5-yl)oxy]methyl}-2-(3-fluorophenyl)cyclopropyl]methyl=acetate solution (concentration of approximately 1 mg/mL)

HPLC Conditions

Same as in (C-1) except that the measurement wavelength of the detector was 283 nm.

(C-6) Production of (1R,2S)-2-{[(2,4-dimethylpyrimidin-5-yl)oxy]methyl}-2-(3-fluorophenyl)cyclopropane carboxylic acid (Compound of Formula IX)

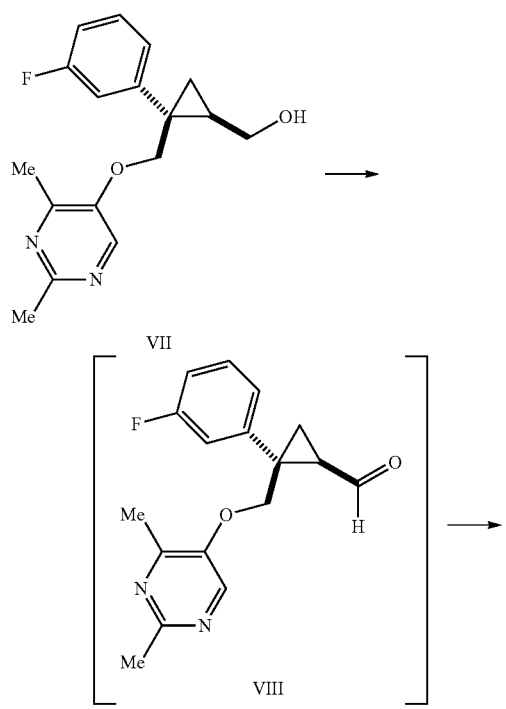

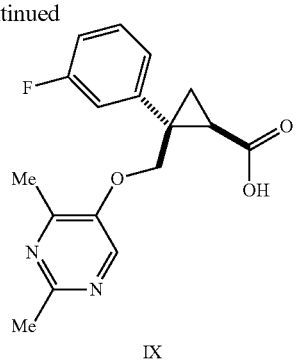

(1) Production of Seed Crystals

A mixture of [(1R,2S)-2-{[(2,4-dimethylpyrimidin-5-yl)oxy]methyl}-2-(3-fluorophenyl)cyclopropyl]methanol) in toluene solution (equivalent to 46.48 kg of [(1R,2S)-2-{[(2,4-dimethylpyrimidin-5-yl)oxy]methyl}-2-(3-fluorophenyl)cyclopropyl]methanol, 154 mol, 1.00 equiv.), a 2,2,6,6-tetramethylpiperidin 1-oxyl free radical (0.48 kg, 3.1 mol, 0.02 equiv.), toluene (186 L) and a sodium dihydrogenphosphate aqueous solution (6.1 kg of sodium dihydrogenphosphate, 51 mol, 0.33 equiv. and 56 kg of water) was cooled at an external temperature of 7° C., and a 12% sodium hypochlorite aqueous solution (9.1 kg, 15.4 mol, 0.10 equiv.) was added thereto and stirred. A 25% sodium chlorite aqueous solution (61.2 kg, 169 mol, 1.10 equiv.) was added thereto at 25° C. After the end of a reaction was confirmed by HPLC analysis, a sodium sulfite aqueous solution (9.7 kg of sodium sulfite and 93 L of water) was added thereto and stirred. A 25% sodium hydroxide aqueous solution (39 L) was added thereto, stirred at an external temperature of 70° C. for one hour, cooled to 50° C. or lower and left to stand. A water layer was stored, water (23 L) was added to an organic layer, stirred and then left to stand. The organic layer was discharged, the water layer was mixed, toluene (139 L) and a 5N hydrochloric acid aqueous solution were added to adjust the pH to 2.5 to 4.0, and the mixture was left to stand. After the water layer was discharged, water (93 L) was added to the organic layer, stirred and then left to stand. The water layer was discharged, and the solvent was distilled away from the obtained organic layer under reduced pressure. Addition of acetonitrile (232 L) and distillation of the solvent under reduced pressure were performed once or more. Acetonitrile (232 L) was added thereto, a (1R,2S)-2-{[(2,4-dimethylpyrimidin-5-yl)oxy]methyl}-2-(3-fluorophenyl)cyclopropane carboxylic acid solution was obtained, and then the solvent was partially distilled away under reduced pressure. Acetonitrile was added to a concentrated residue containing substantially 47.7 kg of (1R,2S)-2-{[(2,4-dimethylpyrimidin-5-yl)oxy]methyl}-2-(3-fluorophenyl)cyclopropane carboxylic acid to adjust the total volume to 232 L. This mixture was dissolved under stirring at an external temperature of 65° C. After the cooling of the mixture, precipitation of crystals was confirmed. The mixture was heated to an internal temperature of 40° C. or higher and cooled to an internal temperature of −15° C. or lower at −20° C./H, and a precipitated solid was filtered and washed with acetonitrile. The obtained solid was dried at an external temperature of 50° C. under reduced pressure, and 43.5 kg of (1R,2S)-2-{[(2,4-dimethylpyrimidin-5-yl)oxy]methyl}-2-(3-fluorophenyl)cyclopropane carboxylic acid was obtained.

(2) Production of (1R,2S)-2-{[(2,4-dimethylpyrimidin-5-yl)oxy]methyl}-2-(3-fluorophenyl)cyclopropane carboxylic acid (Compound of Formula IX)

A mixture of [(1R,2S)-2-{[(2,4-dimethylpyrimidin-5-yl)oxy]methyl}-2-(3-fluorophenyl)cyclopropyl]methanol) toluene solution (equivalent to 82.8 kg of [(1R,2S)-2-{[(2,4-dimethylpyrimidin-5-yl)oxy]methyl}-2-(3-fluorophenyl)cyclopropyl]methanol, 274 mol, 1.00 equiv.), a 2,2,6,6-tetramethylpiperidin 1-oxyl free radical (0.856 kg, 5.48 mol, 0.02 equiv.), toluene (25 L) and a sodium dihydrogenphosphate aqueous solution (10.8 kg of sodium dihydrogenphosphate, 90 mol, 0.33 equiv. and 82.8 kg of water) was cooled at an external temperature of 8° C., and a 12% sodium hypochlorite aqueous solution (48.5 kg, 82 mol, 0.30 equiv.) was added thereto and stirred at 35° C. or lower. After the progress of a reaction was confirmed by HPLC analysis, the mixture was left to stand, and a water layer was discharged. A 25% sodium chlorite aqueous solution (119 kg, 329 mol, 1.20 equiv.) was added to a mixture of an organic layer and a sodium dihydrogenphosphate aqueous solution (16.4 kg of sodium dihydrogenphosphate, 137 mol, 0.50 equiv. and 82.8 kg of water) at 35° C. or lower. After the end of a reaction was confirmed by HPLC analysis, a sodium sulfite aqueous solution (17.3 kg of sodium sulfite and 166 L of water) was added thereto and stirred. A 25% sodium hydroxide aqueous solution (85.9 L) was added thereto, heated and stirred at an external temperature of 70° C., cooled to 50° C. or lower and left to stand. A water layer was stored, water (41 L) was added to an organic layer, stirred and then left to stand. The organic layer was discharged, the water layer was mixed, toluene (248 L) and a 5N hydrochloric acid aqueous solution were added to adjust the pH to 2.5 to 4.0, and the mixture was left to stand. After the water layer was discharged, water (166 L) was added to the organic layer, stirred and then left to stand. The water layer was discharged, and the solvent was distilled away from the obtained organic layer under reduced pressure. Addition of acetonitrile (414 L) and distillation of the solvent under reduced pressure were performed once or more. Acetonitrile (414 L) was added thereto, a (1R,2S)-2-{[(2,4-dimethylpyrimidin-5-yl)oxy]methyl}-2-(3-fluorophenyl)cyclopropane carboxylic acid solution was obtained, and then the solvent was partially distilled away under reduced pressure. Acetonitrile was added to a concentrated residue containing substantially 84.9 kg of (1R,2S)-2-{[(2,4-dimethylpyrimidin-5-yl)oxy]methyl}-2-(3-fluorophenyl)cyclopropane carboxylic acid to adjust the total volume to 497 L. This mixture was dissolved under stirring at an external temperature of 65° C. After cooling, 83 g of seed crystals were added thereto, and precipitation of crystals was confirmed. The mixture was heated to an internal temperature of 40° C. or higher and cooled to 10° C. or lower at −20° C./H, and a precipitated solid was filtered and washed with acetonitrile. The obtained solid was dried at an external temperature of 60° C. or lower under reduced pressure, thereby obtaining 62 kg of (1R,2S)-2-{[(2,4-dimethylpyrimidin-5-yl)oxy]methyl}-2-(3-fluorophenyl)cyclopropane carboxylic acid in an yield of 54% (total yield from (1S,5R)-1-(3-fluorophenyl)-3-oxabicyclo[3.1.0]hexan-2-one).

Conditions for HPLC for Confirming the Above-Described Reaction:
Reagents and Mobile Phases:
Purified water, acetonitrile, trifluoroacetic acid, a mobile phase A liquid, a mobile phase B liquid, and a rinse agent for a needle in an HPLC device were the same as in (C-1).

Solution: Liquid mixture of water and acetonitrile (1/1, v/v)
[(1R,2S)-2-{[(2,4-dimethylpyrimidin-5-yl)oxy]methyl}-2-(3-fluorophenyl)cyclopropyl]methanol solution (concentration of approximately 1 mg/mL)
HPLC Conditions
Same as in (C-1) except that the measurement wavelength of the detector was 283 nm.
NMR Data
(1R,2S)-2-(((2,4-dimethylpyrimidin-5-yl)oxy)methyl)-2-(3-fluorophenyl)-cyclopropane carboxylic acid:
$^1$H NMR (500 MHz, DMSO-d$_6$) δ12.47 (s, 1H), 8.17 (s, 1H), 7.39 (td, J=8.0, 6.4 Hz, 1H), 7.29 (d, J=7.9 Hz, 1H), 7.27-7.22 (m, 1H), 7.10 (td, J=8.3, 2.1 Hz, 1H), 4.63 (d, J=10.2 Hz, 1H), 4.30 (d, J=10.2 Hz, 1H), 2.46 (s, 3H), 2.26 (s, 3H), 2.13 (dd, J=7.7, 6.6 Hz, 1H), 1.63-1.54 (m, 2H);
$^{13}$C NMR (126 MHz, DMSO-d$_6$) δ172.65, 162.48 (d, JCF=243.6 Hz), 159.08, 156.24, 149.45, 145.15 (d, JCF=7.5 Hz), 139.60, 130.71 (d, JCF=8.5 Hz), 124.79 (d, JCF=2.6 Hz), 115.60 (d, JCF=21.8 Hz), 114.32 (d, JCF=20.8 Hz), 71.15, 33.92 (d, JCF=2.0 Hz), 26.46, 24.96, 19.72, 18.70.

(D) Production of (1R,2S)-2-(((2,4-dimethylpyrimidin-5-yl)oxy)methyl)-2-(3-fluorophenyl)-N-(5-fluoropyridin-2-yl)cyclopropanecarboxamide (Lemborexant: Compound of Formula XI)

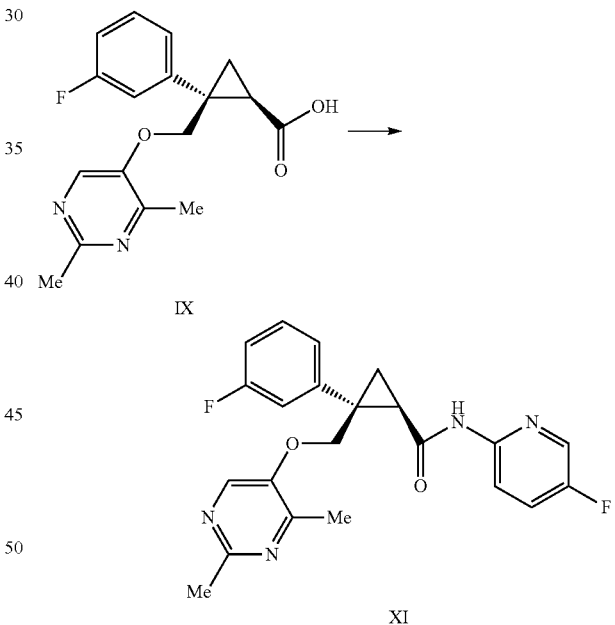

A mixture of (1R,2S)-2-{[(2,4-dimethylpyrimidin-5-yl)oxy]methyl}-2-(3-fluorophenyl)cyclopropane carboxylic acid (62.4 kg, 197 mol, 1.00 equiv.), 5-fluoropyrimidin-2-amine (24.3 kg, 217 mol, 1.10 equiv.), ethyl acetate (499 L), N,N-diisopropylethylamine (53.5 kg, 414 mol, 2.10 equiv.) and 1-propanephosphoric acid anhydride (50% ethyl acetate solution) (188 kg, 296 mol, 1.50 equiv.) was heated at an external temperature of 70° C., and the end of a reaction was confirmed by HPLC analysis. After a reaction liquid was cooled, 312 L of purified water was added thereto, stirred and then left to stand. After a water layer was discharged, a sodium carbonate aqueous solution (68.9 kg of sodium carbonate and 312 L of water) was added to an organic layer, stirred and then left to stand. After the water layer was discharged, purified water (187 L) was added to the organic layer, stirred and then left to stand. The water layer was discharged, and purified water (187 L) was added to the organic layer, stirred and then left to stand. The water layer was discharged, and the organic layer was filtered. A clarification filtration line was rinsed with ethyl acetate, and the solvent was then partially distilled away under reduced pressure. A mixture prepared by adding ethyl acetate to a concentrated residue (containing substantially 75.3 kg of lemborexant) such that the total volume reached 256 L was heated and dissolved under stirring at an external temperature of 60° C. and then cooled to 45° C. or lower by adding n-heptane (12.8 kg) thereto. Ethyl acetate (31 L) was added thereto, the mixture was cooled to 35° C. or lower, and then n-heptane (670 kg) was added thereto. After that, a suspension was cooled to 10° C. or lower, and a solid in the mixture was filtered and washed with a liquid mixture of ethyl acetate and n-heptane. The obtained solid was dried at an external temperature of 60° C. under reduced pressure, thereby obtaining lemborexant (70 kg) in a yield of 87%.

Conditions for HPLC for Confirming the Above-Described Reaction:

Reagents and Mobile Phases:

Purified water, acetonitrile, trifluoroacetic acid, a mobile phase A liquid, a mobile phase B liquid, and a rinse agent for a needle in an HPLC device were the same as in (C-1).

Solution: Liquid mixture of water and acetonitrile (1/1, v/v)

Standard sample of (1R,2S)-2-{[(2,4-dimethylpyrimidin-5-yl)oxy]methyl}-2-(3-fluorophenyl)-cyclopropane carboxylic acid HPLC Conditions Same as in (C-1) except that the measurement wavelength of the detector was 283 nm.

NMR Data (1R,2S)-2-(((2,4-dimethylpyrimidin-5-yl)oxy)methyl)-2-(3-fluorophenyl)-N-(5-fluoropyridin-2-yl)cyclopropanecarboxamide:

$^1$H NMR (500 MHz, DMSO-d$_6$) δ11.19 (s, 1H), 8.31 (d, J=3.0 Hz, 1H), 8.12 (s, 1H), 7.94-7.85 (m, 1H), 7.62 (tt, J=8.7, 3.1 Hz, 1H), 7.44 (dd, J=10.6, 1.5 Hz, 1H), 7.41-7.40 (m, 1H), 7.39 (s, 1H), 7.14-7.06 (m, 1H), 4.67 (d, J=10.2 Hz, 1H), 4.29 (t, J=9.9 Hz, 1H), 2.63 (t, J=7.0 Hz, 1H), 2.38 (s, 3H), 2.03 (s, 3H),1.76-1.64 (m, 1H), 1.49 (dd, J=8.0, 4.8 Hz, 1H);

$^{13}$C NMR (125 MHz, DMSO-d$_6$) δ168.68, 161.98 (d, JCF=242.3 Hz), 158.46, 155.15, 155.38 (d, JCF=247.9 Hz), 148.90, 148.51, 145.00 (d, JCF=7.7 Hz), 139.37, 135.15 (d, JCF=24.9 Hz), 130.06 (d, JCF=8.4 Hz), 125.05 (d, JCF=19.5 Hz), 124.70 (d, JCF=2.6 Hz), 115.71 (d, JCF=21.7 Hz), 114.20 (d, JCF=4.1 Hz), 113.70 (d, JCF=20.9 Hz), 70.80, 34.09 (d, JCF=1.9 Hz), 26.90, 24.38, 18.37, 17.78.

Purity Test

A standard product of the compound of Formula XI produced by the method of International Publication WO. 2013/123240 was used as an external contrast, and the peak areas of impurities in the standard product and in a sample were compared with each other, thereby calculating the mass percentage of each compound in the sample. The total of impurities detected to exceed 0.05 mass % was regarded as the content of total related substances.

Testing method: Liquid chromatography, ultraviolet absorptiometer and peak area

Quantitation method of compound of Formula XI

Compound of Formula XI (%)=$A_T/C_T \times C_S/A_S \times 100$ $A_T$: Peak area of compound of Formula XI in sample solution $A_S$: Peak area of compound of Formula XI in standard solution $C_T$: Concentration of compound of Formula XI in sample solution (mg/mL)

$C_S$: Concentration of compound of Formula XI in standard solution (mg/mL)

Each related substance (%)=$A_T/C_T \times C_S/A_S$

Total related substances (%)=Total of related substances in sample solution $A_T$: Peak area of each related substance in sample solution $A_S$: Peak area of compound of Formula XI in 1% standard solution $C_T$: Concentration of compound of Formula XI in sample solution (mg/mL)

$C_S$: Concentration of compound of Formula XI in standard solution (mg/mL)

Analysis Method

Sample solution: The present product is dissolved with a diluted solution (approximately 0.5 mg/mL)

Standard solution of compound of Formula XI: A standard substance of the compound of Formula XI is dissolved with a diluted solution (approximately 0.5 mg/mL)

1% Standard solution: The standard solution (approximately 0.5 mg/mL) of the compound of Formula XI is diluted 100 times with a diluted solution Diluted solution: Liquid mixture of methanol and water (7:3)

Injection amount: 10 μL

Measurement area range: 70 minutes after injection of the sample solution

Testing Conditions

HPLC Conditions:

Measurement wavelength: 281 nm

Column: Stainless steel pipe having an inner diameter of 4.6 mm and a length of 15 cm and filled with 2.7 μam octadecyl-silylated silica gel for liquid chromatograph Example: Meteoric Core C18 (YMC) (or Equivalent Product)

Column temperature: Constant temperature near 40° C.

Mobile Phases:

A liquid: Liquid mixture of water, acetonitrile and ammonium formate (950:50:1, v/v/w)

B liquid: Liquid mixture of acetonitrile, water and ammonium formate (900:100:1, v/v/w)

Flow rate: Constant flow rate of approximately 10 mL/min

TABLE 1

| Solution sending of mobile phase | | |
|---|---|---|
| Time after injection (minutes) | Mobile phase A (vol %) | Mobile phase B (vol %) |
| 0 to 10 | 95 to 67 | 5 to 33 |
| 10 to 40 | 67 | 33 |
| 40 to 65 | 67 to 0 | 33 to 100 |
| 65 to 70 | 0 | 100 |

The results of the purities analyzed using liquid chromatography for the compound represented by Formula XI obtained in the above-described example and the compounds of Formula XI obtained in different embodiments 1 to 5 in which the same test as in the example was performed are shown in Table 2.

TABLE 2

|  | Example | \multicolumn{5}{c}{Different embodiment} |
|---|---|---|---|---|---|---|
|  |  | 1 | 2 | 3 | 4 | 5 |
| Content of compound of Formula XI | 99.8 | 98.6 | 98.7 | 98.7 | 100.0 | 99.6 |
| Content of compound of Formula XII | 0.06 | 0.07 | 0.08 | 0.06 | 0.07 | 0.07 |
| Content of each of other related substance | ≤0.05 | ≤0.05 | ≤0.05 | ≤0.05 | ≤0.05 | ≤0.05 |
| Content of all related substances | 0.1 | 0.07 | 0.08 | 0.06 | 0.1 | 0.1 |

(mass %)

The retention time of the compound represented by Formula XI was 28±3 minutes. The relative retention time of each impurity with respect to the retention time of the compound of Formula XI was as described below.

Compound of Formula XV: 0.08
Compound of Formula VI: 0.11
Compound of Formula X: 0.16
Compound of Formula IX: 0.39
Compound of Formula XIV: 0.41
Compound of Formula XII: 0.76
Compound of Formula XIII: 1.36

The invention claimed is:

1. A method for producing a compound of Formula III:

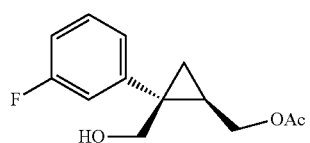

III comprising:
a) adding a Grignard reagent to a mixture comprising a compound of Formula II:

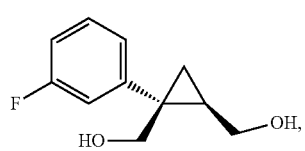

II toluene and tetrahydrofuran; and
b) adding the mixture to a mixture comprising acetyl chloride and ethyl acetate.

2. The method according to claim 1, wherein the Grignard reagent is cyclohexylmagnesium chloride.

3. A method for producing a compound of Formula XI:

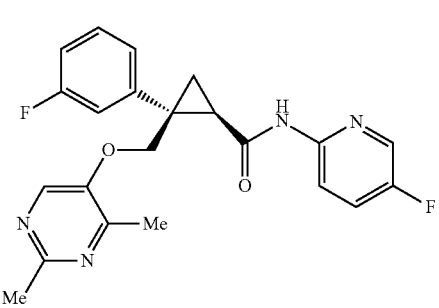

XI comprising:
a manufacturing process for producing the compound of Formula III according to claim 1.

4. The method according to claim 3, comprising:
stirring a mixture of
i) a compound of Formula IX:

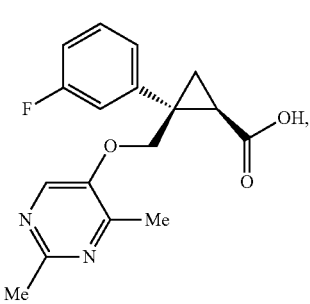

IX ii) a compound of Formula X:

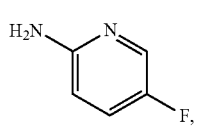

X iii) ethyl acetate,
iv) N,N-diisopropylethylamine, and
v) 1-propanephosphonic acid
at a temperature of 60° C. to 80° C.

5. A method for producing a compound of Formula IX:

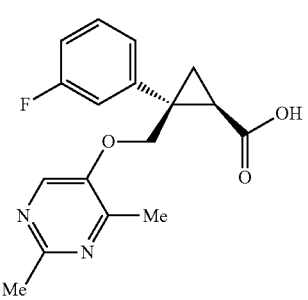

IX comprising:
    producing the compound of Formula III according to claim 1.

6. The method according to claim 5, wherein said compound of Formula IX:

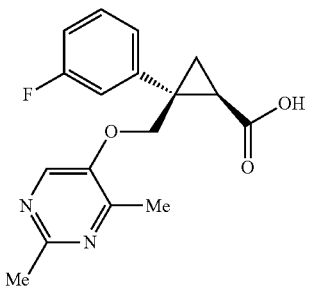

is produced by comprising:
    allowing a compound of Formula VII:

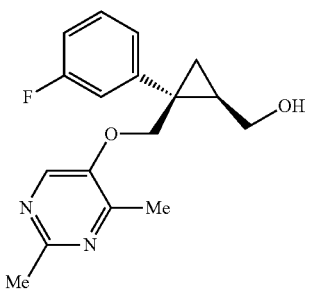

to react with an oxidant.

7. The method according to claim 6, comprising:
    sequentially adding sodium hypochlorite and sodium chlorite as the oxidant.

8. The method according to claim 5, wherein said compound of Formula IX:

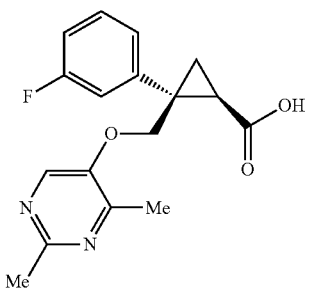

is produced by comprising:
    a) oxidizing a compound of Formula VII:

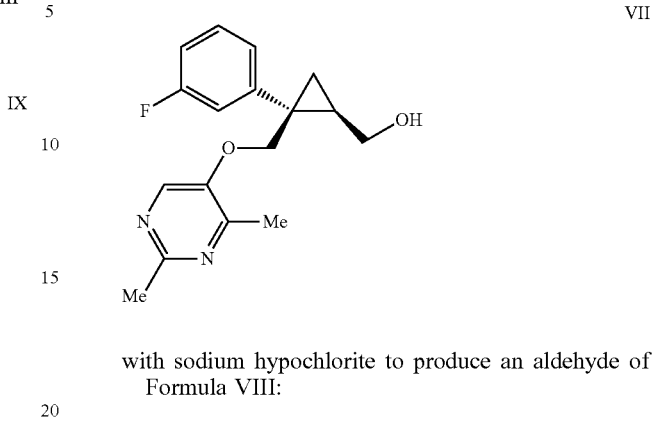

with sodium hypochlorite to produce an aldehyde of Formula VIII:

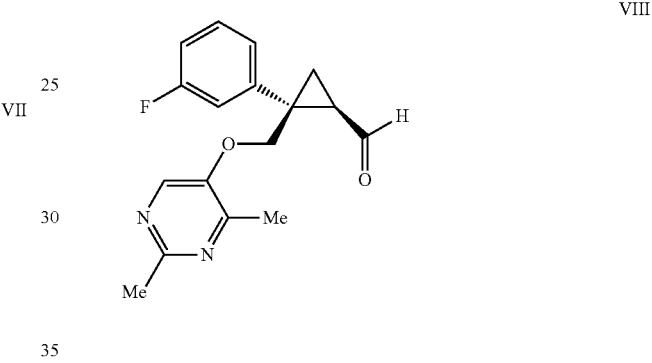

and
    b) oxidizing the aldehyde with sodium chlorite.

9. The method according to claim 8, wherein the oxidation in the step a) is catalyzed with an effective amount of 2,2,6,6-tetramethylpiperidin 1-oxyl (TEMPO).

10. The method according to claim 5, wherein said compound of Formula VII:

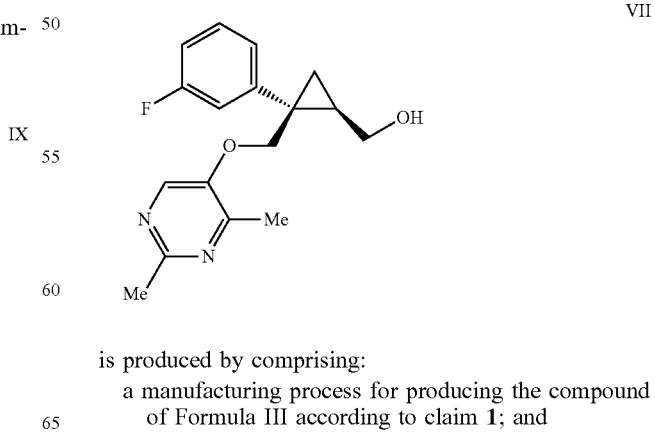

is produced by comprising:
    a manufacturing process for producing the compound of Formula III according to claim 1; and
    adding a sodium hydroxide aqueous solution to a compound of Formula V:

V

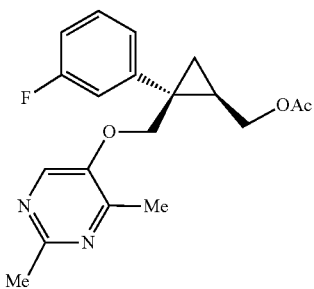

and stirring both at a temperature of 30° C. to 50° C.

11. The method according to claim 10, wherein said compound of Formula V:

V

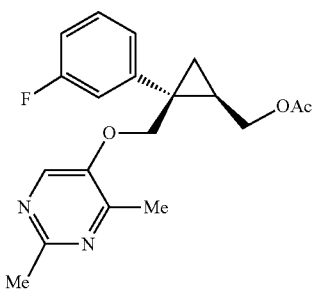

is produced by comprising:
a) adding potassium tert-butoxide to a mixture of
i) a compound of Formula VI:

VI

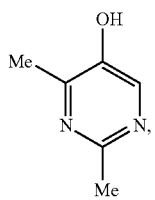

ii) N-methylpyrrolidone, and
iii) acetonitrile and
stirring the mixture at a temperature of 40° C. to 70° C.; and
b) stirring a mixture obtained by adding
i) a compound of Formula IV:

IV

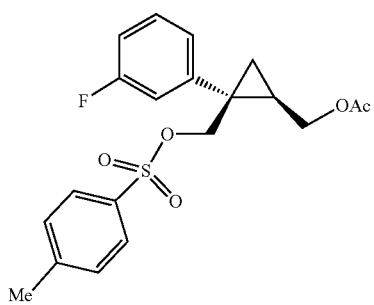

to the mixture at a temperature of 40° C. to 70° C.

12. The method according to claim 11, wherein said compound of Formula IV:

IV

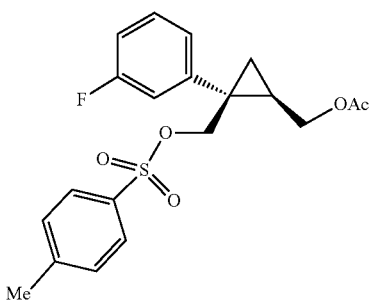

is produced by comprising:
adding a mixture of ii) p-toluenesulfonyl chloride, toluene and acetonitrile to a composition comprising
i) a compound of Formula III:

III

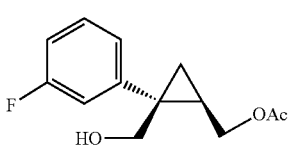

produced by the method according to claim 1, toluene, triethylamine and 1-methylimidazole.

13. The method according to claim 1, wherein said compound of Formula II:

II

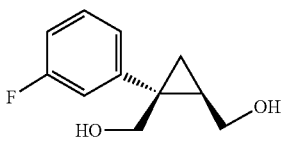

is produced by comprising:
adding methanol to a composition comprising a compound of Formula I:

I

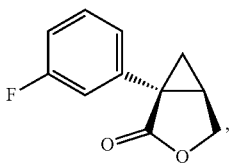

toluene, tetrahydrofuran and sodium borohydride.

* * * * *